(12) United States Patent
Matsuura et al.

(10) Patent No.: US 8,889,759 B2
(45) Date of Patent: Nov. 18, 2014

(54) ACTIVE ENERGY RAY-CURABLE COMPOSITION, AND COATED ARTICLE

(75) Inventors: Yoshinari Matsuura, Hiratsuka (JP); Akinori Nagai, Hiratsuka (JP); Atsuya Kato, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 195 days.

(21) Appl. No.: 13/522,127

(22) PCT Filed: Jan. 5, 2011

(86) PCT No.: PCT/JP2011/050065
§ 371 (c)(1),
(2), (4) Date: Jul. 13, 2012

(87) PCT Pub. No.: WO2011/086958
PCT Pub. Date: Jul. 21, 2011

(65) Prior Publication Data
US 2012/0296001 A1    Nov. 22, 2012

(30) Foreign Application Priority Data

Jan. 14, 2010 (JP) ................................. 2010-005597
Aug. 31, 2010 (JP) ................................. 2010-194612

(51) Int. Cl.
*C08F 2/42* (2006.01)
*C08J 3/28* (2006.01)
*C08G 77/388* (2006.01)
*C08F 2/44* (2006.01)
*C09D 4/00* (2006.01)

(52) U.S. Cl.
CPC ............... *C08G 77/388* (2013.01); *C08F 2/44* (2013.01); *C09D 4/00* (2013.01)
USPC ............. 522/174; 522/71; 522/74; 522/83; 522/77; 522/150; 522/152; 522/173; 252/183.11; 252/183.13; 556/9; 556/420

(58) Field of Classification Search
USPC ......... 522/71, 74, 77, 83, 150, 152, 173, 174; 252/183.11, 183.13; 556/420, 9
See application file for complete search history.

(56) References Cited

U.S. PATENT DOCUMENTS

2008/0280149 A1    11/2008  Higuchi et al.
2013/0059941 A1*    3/2013  Craig et al. ................... 523/116

FOREIGN PATENT DOCUMENTS

| EP | 0 869 154 | 10/1998 |
|---|---|---|
| JP | 45-023354 | 8/1970 |
| JP | 05-230397 | 9/1993 |
| JP | 06-128502 | 5/1994 |
| JP | 2002-317130 | 10/2002 |
| JP | 2005-036050 | 2/2005 |
| JP | 2009-206197 | 9/2009 |
| TW | 200909537 | 3/2009 |
| WO | 97/11129 | 3/1997 |

OTHER PUBLICATIONS

International Search Report issued Mar. 22, 2011 in International (PCT) Application No. PCT/JP2011/050065, of which the present application is the national stage.

* cited by examiner

*Primary Examiner* — Sanza McClendon
(74) *Attorney, Agent, or Firm* — Wenderoth, Lind & Ponack, L.L.P.

(57) ABSTRACT

An object to be attained by the present invention is to provide an active energy ray-curable composition that is capable of producing a cured coating film having high scratch resistance and excellent transparency. The present invention relates to an active energy ray-curable composition containing a reactive particle (A) obtained by reacting a silica fine particle (a-1) and a hydrolysable silane (a-2) having one or more (meth)acryloyloxy groups and one or more isocyanurate ring structures in a molecule. The present invention also provides the active energy ray-curable composition according to the above, containing a photopolymerization initiator (B).

8 Claims, No Drawings

ACTIVE ENERGY RAY-CURABLE COMPOSITION, AND COATED ARTICLE

TECHNICAL FIELD

The present invention relates to an active energy ray-curable composition and a coated article.

BACKGROUND ART

Since synthetic resins such as polymethyl methacrylate resins, polystyrene resins, and polycarbonate resins have excellent impact resistance and transparency, and are light and easily processed, they are used in skylight material of buildings, windows for vehicles, lamp lenses, instrument covers, and the like as a material substitute for glass. However, since synthetic resins have poor surface properties such as scratch resistance, chemical resistance, and weather resistance, compared to glass, the surface properties of the synthetic resins are modified. A method of coating heat-curable coating compositions such as a polyorganosiloxane-based composition and a melamine-based composition, and a method of coating polyfunctional acrylate-based active energy ray-curable compositions have been proposed as methods of improving the surface properties of synthetic resins.

Regarding these methods, Patent Literature 1 and 2 disclose the inventions of coating compositions obtained by mixing poly(meth)acrylate of mono- or poly-pentaerythritol, urethane(meth)acrylate having at least two (meth)acryloyl groups in a molecule, and poly[(meth)acryloyloxy alkyl]isocyanurate in a specific proportion.

Recently, in accordance with expansion of the outdoor application of synthetic resins, further improvement in the surface properties of synthetic resins is desired; in particular, high scratch resistance is demanded. However, the inventions recited in Patent Literature 1 and 2 do not satisfy the demand for high scratch resistance.

On the other hand, a method of adding inorganic material or inorganic-organic hybrid material to a coating composition is known as a method of improving the scratch resistance of the coating composition. For example, Patent Literature 3 discloses the invention of an abrasion-resistant coating composition comprising a reactive particle in which a radical polymerizable silane compound is chemically modified with a colloidal silica fine particle, poly[(meth)acryloyloxy alkyl]isocyanurate, urethane(meth)acrylate having at least two (meth)acryloyloxy groups and an alicyclic skeleton in a molecule, and a photopolymerization initiator. Although this invention can provide a cured coating film with scratch resistance, when the amount of reactive particles is increased to improve scratch resistance, the transparency of the resulting cured coating film is reduced.

CITATION LIST

Patent Literature

PTL 1: Japanese Unexamined Patent Publication No. H5-230397
PTL 2: Japanese Unexamined Patent Publication No. H6-128502
PTL 3: WO97/011129

SUMMARY OF INVENTION

Technical Problem

The present invention was made in view of the above circumstances. An object of the present invention is to obtain an active energy ray-curable composition that can provide a cured coating film having high scratch resistance and excellent transparency.

Solution to Problem

The present inventors conducted extensive research to solve the above object. As a result, they found that the use of the active energy ray-curable coating composition containing a specific reactive particle can solve the above object, and they accomplished the present invention.

Specifically, the present invention is described as follows.
1. An active energy ray-curable composition comprising a reactive particle (A) obtained by reacting a silica fine particle (a-1) and a hydrolysable silane (a-2) having one or more (meth)acryloyloxy groups and one or more isocyanurate ring structures in a molecule.
2. The active energy ray-curable composition according to Item 1, comprising a photopolymerization initiator (B).
3. An active energy ray-curable composition according to Item 1 or 2, comprising a polymerizable unsaturated compound (C) other than the aforementioned component (A).
4. A coated article obtained by applying the active energy ray-curable composition according to any one of Items 1 to 3 on a substrate.

Advantageous Effects of Invention

With the active energy ray-curable composition of the present invention, a cured coating film having high scratch resistance and excellent transparency can be obtained.

BRIEF DESCRIPTION OF DRAWINGS

The active energy ray-curable composition of the present invention comprises a reactive particle (A) (hereinbelow, sometimes abbreviated as a "component (A)" or "reactive particle (A)") obtained by reacting a silica fine particle (a-1) and a hydrolysable silane (a-2) having one or more (meth)acryloyloxy groups and one or more isocyanurate ring structures in a molecule (hereinafter, sometimes abbreviated as a "compound (a-2)").

Reactive Particle (A)

The reactive particle (A) is obtained by reacting a silica fine particle (a-1) and a hydrolysable silane (a-2) having one or more (meth)acryloyloxy groups and one or more isocyanurate ring structures in a molecule.

Silica Fine Particle (a-1)

Examples of the silica fine particle (a-1) include colloidal silica fine particles, silica fine powders, and the like.

Colloidal silica fine particles are obtained by dispersing silica ultrafine particles in a dispersion medium.

Examples of the dispersion medium include water; alcohol-based solvents such as methanol, ethanol, isopropanol, n-propanol, isobutanol, and n-butanol; polyhydric alcohol-based solvents such as ethylene glycol; polyhydric alcohol derivatives such as ethylene glycol monoethyl ether and ethylene glycol monobutyl ether; ketone-based solvents such as methyl ethyl ketone, methyl isobutyl ketone, and diacetone alcohol; and monomer compounds such as 2-hydroxyethyl acrylate, 2-hydroxypropyl acrylate, and tetrahydrofurfuryl acrylate. Of these, water, methanol, ethanol, isopropanol, and the like are preferable from the viewpoint of ease of manufacture.

Examples of the colloidal silica fine particles include methanol silica sol, IPA-ST, MEK-ST, NBA-ST, XBA-ST, DMAC-ST, PGM-ST, ST-UP, ST-OUP, ST-20, ST-40, ST-C, ST-N, ST-O, ST-50, ST-OL, (all produced by Nissan Chemical Industries, Ltd.) and the like.

Examples of the silica fine powders include Aerosil 130, Aerosil 300, Aerosil 380, Aerosil TT600, and Aerosil OX50 (all produced by Nippon Aerosil Co., Ltd.); Sildex H31, H32, H51, H52, H121, and H122 (all produced by Asahi Glass Co., Ltd.); E220A and E220 (all produced by Japan Silica Co., Ltd.); SYLYSIA 470 (by Fuji Silysia Chemical Ltd.), and the like.

The average primary particle diameter of the silica fine particle (a-1) is preferably 1 to 200 nm, and more preferably 5 to 80 nm. The lower limit of this scope is significant in inhibiting gelation during the reaction with the compound (a-2). The upper limit of this scope is significant in terms of the transparency of the cured coating film obtained by the active energy ray-curable composition of the present invention.

The average primary particle diameter of the present invention is the median diameter (d50) of volume-based particle size distribution measured by a dynamic light scattering method. The average primary particle diameter can be measured, for example, by a Nanotrac size distribution measuring device produced by Nikkiso Co., Ltd.

Hydrolysable Silane (a-2) Having One or More (Meth)Acryloyloxy Groups and One or More Isocyanurate Ring Structures in a Molecule A hydrolysable silane (a-2) having one or more (meth) acryloyloxy groups and one or more isocyanurate ring structures in a molecule has a hydrolysable silyl group. The hydrolysable silyl group is a silanol group or a group that produces a silanol group by hydrolysis. Examples of the group producing a silanol group include silicon to which alkoxy, aryloxy, acetoxy, halogen, etc., is bonded, or the like. As an alkoxy group, those having 1 to 8 carbon atoms are preferable, and as an aryloxy group, those having 6 to 18 carbon atoms are preferable. Chlorine is an example of a halogen atom.

In the present specification, "(meth)acryloyloxy group" means "acryloyloxy group or methacryloyloxy group." In addition, "(meth)acrylate" means "acrylate or methacrylate", "(meth)acrylic acid" means "acrylic acid or methacrylic acid", and "(meth)acrylamide" means "acrylamide or methacrylamide."

The compound (a-2) is, for example, a hydrolysable silane represented by formula (I) below.

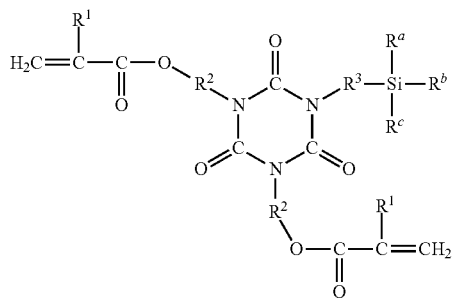

(I)

wherein $R^1$ may be the same or different and represents a hydrogen atom or a methyl group, $R^2$ may be the same or different and represents a divalent organic group, and $R^3$ represents a divalent organic group. At least one of the $R^a$, $R^b$, and $R^c$ represents a halogen atom, hydroxy group, alkoxy group, or aryloxy group, and the other(s) represent(s) a hydrogen atom, alkyl group, or aryl group.

$R^2$ is not limited as long as it is a divalent organic group. Examples of the divalent organic group include those having 1 to 100 carbon atoms, and those having 1 to 30 carbon atoms are preferable. The divalent organic group is not limited to a hydrocarbon group, and it may have a urethane bond, ester bond, ether bond, or the like.

$R^3$ is not limited as long as it is a divalent organic group. Examples of the divalent organic group include those having 1 to 100 carbon atoms, and those having 1 to 30 carbon atoms are preferable. The divalent organic group is not limited to a hydrocarbon group, and it may have a urethane bond, ester bond, ether bond, or the like.

Examples of the alkoxy group represented by $R^a$, $R^b$, or $R^c$ include those having 1 to 8 carbon atoms, and a methoxy group, ethoxy group, propoxy group, butoxy group, octyloxy group, and the like are preferable.

Examples of the alkyl group represented by $R^a$, $R^b$, or $R^c$ include those having 1 to 8 carbon atoms, and a methyl group, ethyl group, propyl group, butyl group, octyl group, and the like are preferable.

Examples of the aryloxy group represented by $R^a$, $R^b$, or $R^c$ include those having 6 to 18 carbon atoms, and a phenoxy group, xylyloxy group, and the like are preferable.

Examples of the aryl group represented by $R^a$, $R^b$, or $R^c$ include those having 6 to 18 carbon atoms, and a phenyl group, xylyl group, and the like are preferable.

Examples of the group represented by $R^a(R^b)(R^c)Si-$ include a trimethoxysilyl group, triethoxysilyl group, triphenoxysilyl group, methyldimethoxysilyl group, dimethylmethoxysilyl group, and the like. Of these, a trimethoxysilyl group, triethoxysilyl group, and the like are preferable.

Specific examples of the hydrolysable silane represented by formula (I) include hydrolysable silanes represented by formula (II) and hydrolysable silanes represented by formula (III).

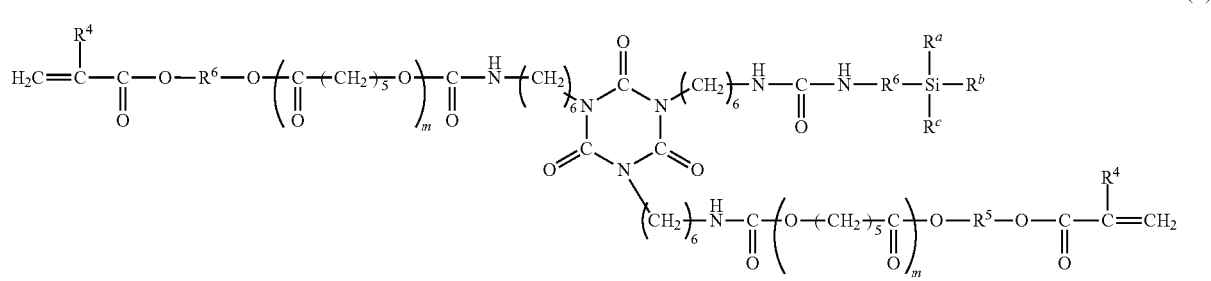

(II)

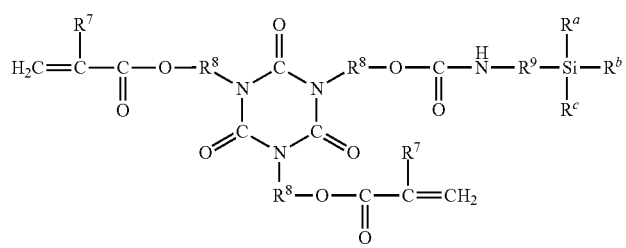

(III)

In formula (II), $R^4$ may be the same or different and represents a hydrogen atom or a methyl group, $R^5$ may be the same or different and represents a $C_{1-6}$ divalent hydrocarbon group, $R^6$ represents a $C_{1-4}$ divalent hydrocarbon group, m is the same or different and represents an integer of 0 to 5. $R^a$, $R^b$, and $R^c$ are the same as above. In formula (III), $R^7$ may be the same or different and represents a hydrogen atom or a methyl group, $R^8$ may be the same or different and represents a $C_{1-6}$ divalent hydrocarbon group, $R^9$ represents a $C_{1-4}$ divalent hydrocarbon group, and $R^a$, $R^b$, and $R^c$ are the same as above.

$R^5$ is not limited as long as it is a $C_{1-6}$ divalent hydrocarbon group. Examples of $R^5$ include a methylene group, ethylene group, 1,2-propylene group, 1,3-propylene group, 1,2-butylene group, 1,4-butylene group, hexylene group, and the like. Of these, a $C_{2-4}$ divalent hydrocarbon group is preferable from the viewpoint of transparency of the obtained cured coating film.

$R^6$ is not limited as long as it is a $C_{1-4}$ divalent hydrocarbon group. Examples of $R^6$ include an ethylene group, 1,2-propylene group, 1,3-propylene group, 1,2-butylene group, 1,4-butylene group, and the like.

As the organic group represented by formula (II), an organic group in which $R^4$ is a hydrogen atom, $R^5$ is an ethylene group, $R^6$ is a 1,3-propylene group, and m is 0 is preferable from the viewpoint of scratch resistance, transparency, and active energy ray curability in the presence of a photopolymerization initiator.

$R^8$ is not limited as long as it is a $C_{1-6}$ divalent hydrocarbon group. Examples thereof include a methylene group, ethylene group, 1,2-propylene group, 1,3-propylene group, 1,2-butylene group, 1,4-butylene group, hexylene group, and the like. Of these, a $C_{2-4}$ divalent hydrocarbon group is preferable from the viewpoint of transparency of the obtained cured coating film.

$R^9$ is not limited as long as it is a $C_{1-4}$ divalent hydrocarbon group. Examples thereof include an ethylene group, 1,2-propylene group, 1,3-propylene group, 1,2-butylene group, 1,4-butylene group, and the like.

As the organic group represented by formula (III), an organic group in which $R^7$ is a hydrogen atom, $R^8$ is an ethylene group, and $R^9$ is a 1,3-propylene group is preferable to attain excellent scratch resistance, transparency, and active energy ray curability in the presence of a photopolymerization initiator.

The method of producing the hydrolysable silane represented by formula (II) is illustrated. The hydrolysable silane represented by above formula (II) can be obtained by reacting the hydrolysable silane represented by formula (IV) and the compound represented by formula (V).

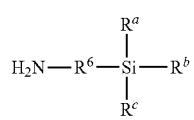

(IV)

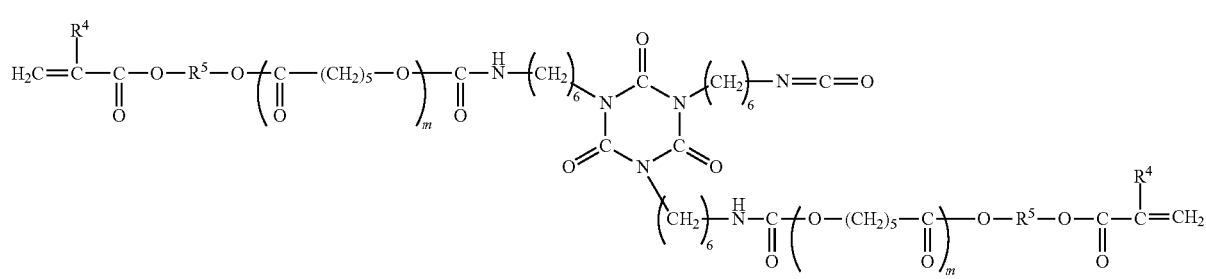

(V)

In formula (IV), $R^6$, $R^a$, $R^b$, and $R^c$ are the same as above.

In formula (V), $R^4$, $R^5$, and m are the same as above.

Examples of the hydrolysable silane represented by formula (IV) include 3-aminopropyltrimethoxysilane, 3-aminopropyltriethoxysilane, and the like.

Although the proportion of the hydrolysable silane represented by formula (IV) and the compound represented by formula (V) is not limited, in general, reaction is performed using the isocyanate group of the compound represented by formula (V) in an equimolar amount based on the amino group of the hydrolysable silane represented by formula (IV).

This reaction can be performed according to the known method of reacting an amino group and an isocyanate group. The reaction temperature is, for example, −78 to 200° C., preferably −78 to 100° C., and more preferably −10 to 40° C. Although this reaction can be performed under any pressure, the pressure range is preferably 0.02 to 0.2 MPa, and particularly preferably 0.08 to 0.15 MPa.

A solvent can be optionally used in the reaction. Examples of the solvent include ester-based solvents such as ethyl acetate, butyl acetate, methyl benzoate, and methyl propionate; ether-based solvents such as tetrahydrofuran, dioxane, and dimethoxyethane; glycol ether-based solvents such as propylene glycol monomethyl ether, propylene glycol monomethyl ether acetate, and 3-methoxy butyl acetate; aromatic hydrocarbon-based solvents such as toluene and xylene; aliphatic hydrocarbon-based solvents; and the like.

The compound represented by formula (V) can be obtained by reacting the compound represented by formula (VI) and the compound represented by formula (VII).

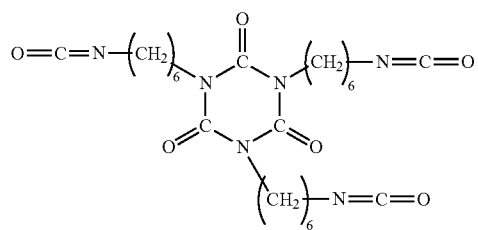
(VI)

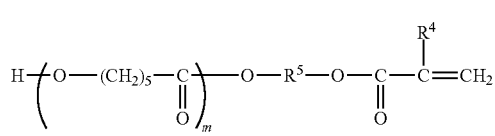
(VII)

The compound represented by formula (VI) is an isocyanurate ring adduct of a so-called 1,6-hexamethylene diisocyanate, and examples are Sumidur N3300 (produced by Sumika Bayer Urethane Co., Ltd,.), Duranate TPA100 (produced by Asahi Kasei Chemicals Corporation), and the like.

$R^4$, $R^5$, and m in formula (VII) are the same as above. Examples of the compound represented by formula (VII) where m is 0 include 2-hydroxyethyl(meth)acrylate, 2-hydroxypropyl (meth)acrylate, 3-hydroxypropyl(meth)acrylate, 4-hydroxybutyl(meth)acrylate, and the like. Examples of the compound where m is 1 to 5 include caprolactone-modified hydroxyalkyl(meth)acrylate. Specific examples include PLACCEL FA-1, PLACCEL FA-2, PLACCEL FA-2D, PLACCEL FA-3, PLACCEL FA-4, PLACCEL FA-5, PLACCEL FM-1, PLACCEL FM-2, PLACCEL FM-2D, PLACCEL FM-3, PLACCEL FM-4, PLACCEL FM-5 (trade names, all produced by Daicel Chemical Industries, Ltd.), and the like.

Although the proportion of the compound represented by formula (VI) and the compound represented by formula (VII) for the reaction is not limited, the molar ratio of the isocyanate group of the compound represented by formula (VI) and the hydroxy group of the compound represented by formula (VII) is generally NCO/OH=1.05 to 2.00, and preferably 1.10 to 1.50.

This reaction can be performed according to a known method of reacting an isocyanate group and a hydroxy group. The reaction temperature is, for example, 0 to 200° C., preferably 20 to 200° C., more preferably 20 to 120° C. Although the reaction can be performed under any pressure, the pressure range is preferably 0.02 to 0.2 MPa, and particularly preferably 0.08 to 0.15 MPa. The reaction is generally completed in about 2 to 10 hours.

In the reaction, a solvent can be optionally used. Examples of the solvent include ester-based solvents such as ethyl acetate, butyl acetate, methyl benzoate, and methyl propionate; ether-based solvents such as tetrahydrofuran, dioxane, and dimethoxyethane; glycol ether-based solvents such as propylene glycol monomethyl ether, propylene glycol monomethyl ether acetate, and 3-methoxy butyl acetate; aromatic hydrocarbon-based solvents such as toluene and xylene; aliphatic hydrocarbon-based solvents; and the like.

A product obtained by reacting the compound represented by formula (VI) and the compound represented by formula (VII) may include the compound represented by formula (V) and a compound represented by formula (VIII) below

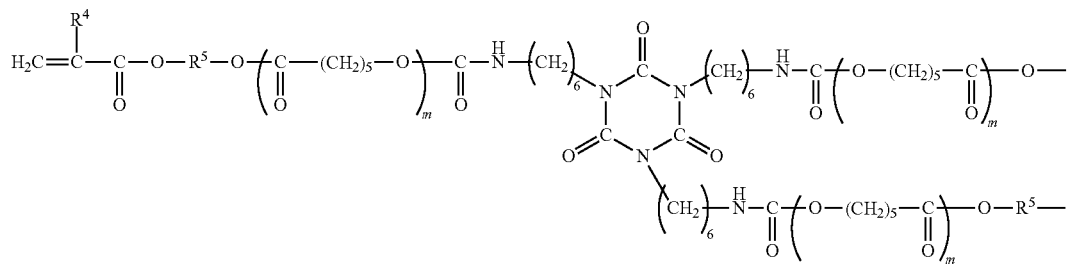
(VIII)

-continued

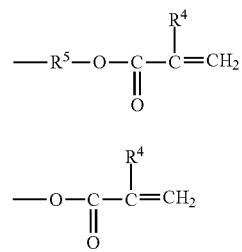

wherein $R^4$, $R^5$, and m are the same as above.

In producing the hydrolysable silane represented by formula (II) and in producing the reactive particle (A) using the hydrolysable silane represented by formula (II), no particular problems occur if the starting material used in the production contains the compound represented by formula (VIII), or the like.

Next, the method of producing the hydrolysable silane represented by formula (III) is illustrated. The hydrolysable silane represented by formula (III) can be obtained by reacting a hydrolysable silane represented by formula (IX) below and a compound represented by formula (X) below.

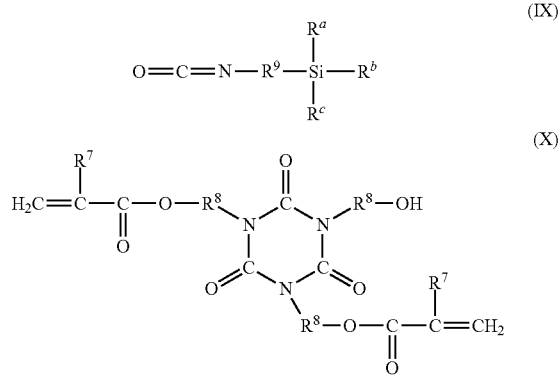

In formula (IX), $R^9$, $R^a$, $R^b$, and $R^c$ are as defined above, and in formula (X), $R^7$ and $R^8$ are as defined above.

Examples of the hydrolysable silane represented by formula (IX) include 3-isocyanate propyltrimethoxysilane, 3-isocyanatepropyl triethoxysilane, and the like.

Examples of the compound represented by formula (X) include bis(2-acryloyloxyethyl)hydroxyethyl isocyanurate, bis(2-acryloyloxypropyl)hydroxyethyl isocyanurate, and the like. Aronix M-215, Aronix M-313 (trade name, both produced by Toagosei Co., Ltd.), and the like are trade names of these products.

Although the proportion of the hydrolysable silane represented by formula (IX) and the compound represented by formula (X) is not limited, reaction is performed using the hydroxy group of the compound represented by formula (X) in an equimolar amount based on the isocyanate group of the hydrolysable silane represented by formula (IX).

The reaction can be performed according to a known method of reacting an isocyanate group and a hydroxy group. The reaction temperature is, for example, 0 to 200° C., preferably 20 to 200° C., and more preferably 20 to 120° C. Although the reaction can be performed under any pressure, the pressure range is preferably 0.02 to 0.2 MPa, and particularly preferably 0.08 to 0.15 MPa. The reaction is generally completed in about 2 to 10 hours.

In the reaction, a solvent can be optionally used. Examples of the solvent include ester-based solvents such as ethyl acetate, butyl acetate, methyl benzoate, and methyl propionate; ether-based solvents such as tetrahydrofuran, dioxane, and dimethoxyethane; glycol ether-based solvents such as propylene glycol monomethyl ether, propylene glycol monomethyl ether acetate, and 3-methoxy butyl acetate; aromatic hydrocarbon-based solvents such as toluene and xylene; aliphatic hydrocarbon-based solvents; and the like.

The compound represented by formula (X) is commercially available under the trade names of, for example, Aronix M-215, Aronix M-313 (both produced by Toagosei Co., Ltd.), etc., as a mixture of a compound represented by formula (XI) below,

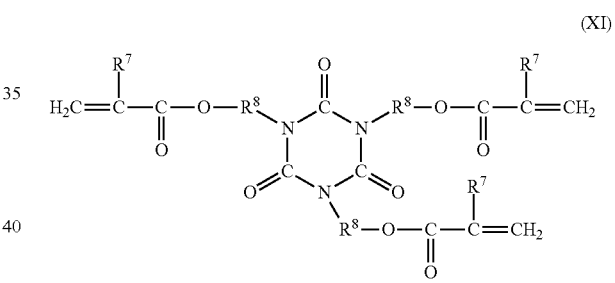

wherein $R^7$ and $R^8$ are the same as above. Examples of such a compound include tris(2-acryloyloxyethyl)isocyanurate, tris(2-acryloyloxypropyl)isocyanurate, and the like.

In producing the hydrolysable silane represented by formula (III) and in producing the reactive particle (A) using the hydrolysable silane represented by formula (III), no particular problems occur if the starting material used in the production contains the compound represented by formula (XI), or the like.

The reactive particle (A) can be obtained by reacting the silica fine particle (a-1) and the compound (a-2). In the reaction, hydrolysable silanes other than the compound (a-2) can be reacted with the compound (a-2).

Examples of hydrolysable silanes other than the compound (a-2) include a hydrolysable silane (a-3) having one or more (meth)acryloyloxy groups in a molecule (hereinafter, sometimes referred to as "compound (a-3)"), which is other than the compound (a-2).

In the reaction of the silica fine particle (a-1) and the compound (a-2) to obtain the reactive particle (A), by reacting the compound (a-3) with the compound (a-2), the obtained reactive particle (A) may exhibit better active energy ray curability in the presence of a photopolymerization initiator.

As the compound (a-3), a hydrolysable silane represented by formula (XII) below can be used,

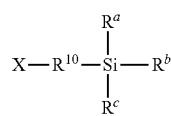

(XII)

wherein X represents a (meth)acryloyloxy group, $R^{10}$ represents a $C_{1-8}$ divalent hydrocarbon group, and $R^a$, $R^b$, and $R^c$ are the same as above.

$R^{10}$ in formula (XII) is not limited as long as it is a $C_{1-8}$ divalent hydrocarbon group. Specific examples thereof include a methylene group, ethylene group, 1,2-propylene group, 1,3-propylene group, 1,2-butylene group, 1,4-butylene group, hexylene group, octylene group, and the like.

As the hydrolysable silane represented by formula (XII), at least one compound selected from 3-methacryloyloxypropyltrimethoxysilane, 3-acryloyloxypropyl trimethoxysilane, 2-methacryloyloxy ethyltrimethoxysilane, 2-acryloyloxyethyl trimethoxysilane, 3-methacryloyloxypropyltriethoxysilane, 3-acryloyloxy propyltriethoxysilane, 2-methacryloyloxyethyltriethoxysilane, 2-acryloyloxyethyltriethoxysilane, 3-methacryloyloxypropylmethyldimethoxysilane, 3-acryloylpxypropylmethyldimethoxysilane, and the like, can be used.

As the compound (a-3), a hydrolysable silane having one or more (meth)acryloyloxy groups and one or more urethane bonds in a molecule can be used in addition to the hydrolysable silane represented by formula (XII).

As the hydrolysable silane having one or more (meth)acryloyloxy groups and one or more urethane bonds in a molecule, a hydrolysable silane represented by formula (XIII) below can be used,

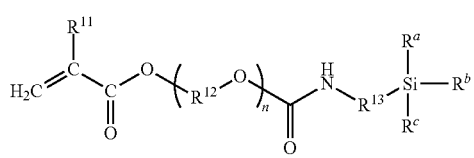

(XIII)

wherein $R^{11}$ represents a hydrogen atom or a methyl group, $R^{12}$ represents a $C_{1-10}$ divalent hydrocarbon group, $R^{13}$ represents a $C_{1-10}$ divalent hydrocarbon group, $R^a$, $R^b$, and $R^c$ are the same as above, and n is an integer of 1 to 10.

$R^{12}$ is not limited as long as it is a $C_{1-10}$ divalent hydrocarbon group. Specific examples include alkylene groups such as a methylene group, ethylene group, 1,2-propylene group, 1,3-propylene group, 1,2-butylene group, 1,4-butylene group, and hexylene group; cyclo alkylene groups such as a cyclohexylene group; allylene groups such as a phenylene group and xylylene group; and the like. Of these, $C_{1-6}$ divalent hydrocarbon groups, in particular, an ethylene group, 1,2-propylene group, and 1,4-butylene group are preferable.

$R^{13}$ is not particularly limited as long as it is a $C_{1-10}$ divalent hydrocarbon group. Specific examples thereof include alkylene groups such as a methylene group, ethylene group, 1,2-propylene group, 1,3-propylene group, 1,2-butylene group, 1,4-butylene group, and hexylene group; cyclo alkylene groups such as a cyclohexylene group; allylene groups such as a phenylene group and xylylene group; and the like. Of these, $C_{1-6}$ divalent hydrocarbon groups, in particular, an ethylene group and 1,3-propylene group are preferable.

n is not limited as long as it indicates an integer of 1 to 10. n is preferably an integer of 1 to 5, more preferably an integer of 1 to 3, and particularly preferably 1.

The hydrolysable silane represented by formula (XIII) can be obtained by reacting a hydrolysable silane represented by formula (XIV) below and a compound represented by formula (XV) below.

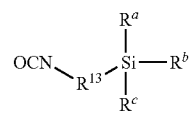

(XIV)

In formula (XIV), $R^{13}$, $R^a$, $R^b$, and $R^c$ are the same as above.

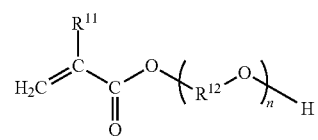

(XV)

In formula (XV), $R^{11}$, $R^{12}$, and n are the same as above.

Examples of the hydrolysable silane represented by formula (XIV) include 3-isocyanatepropyltrimethoxysilane, 3-isocyanatepropyltriethoxysilane, and the like.

Examples of the compound represented by formula (XV) include 2-hydroxyethyl(meth)acrylate, 2-hydroxypropyl (meth)acrylate, 3-hydroxypropyl(meth)acrylate, 4-hydroxybutyl(meth)acrylate, diethylene glycol mono(meth)acrylate, triethylene glycol mono(meth)acrylate, dipropylene glycol mono(meth)acrylate, and the like.

The reaction of the hydrolysable silane represented by formula (XIV) and the compound represented by formula (XV) can be performed according to a known method of reacting an isocyanate group and a hydroxy group.

The proportion of the hydrolysable silane represented by formula (XIV) and the compound represented by formula (XV) in the above reaction scheme is such that the latter is about 0.90 to 1.10 mol, and preferably about 0.95 to 1.05 mol per mol of the former.

The reaction temperature is, for example, 0 to 200° C., preferably 20 to 200° C., more preferably 20 to 120° C. Although the reaction can be performed under any pressure, the pressure range is preferably 0.02 to 0.2 MPa, and particularly preferably 0.08 to 0.15 MPa. The reaction is generally completed in about 2 to 10 hours.

In the reaction, a catalyst can be optionally used. Examples of the catalyst include tertiary amines such as triethylamine; organometallic compounds such as dibutyltin dilaurate; and the like.

In the reaction, a solvent can be optionally used. Examples of the solvent include ketone-based solvents such as acetone, methyl ethyl ketone, methyl isobutyl ketone, cyclohexanone, methyl amyl ketone, ethyl isoamyl ketone, diisobutyl ketone, and methyl hexyl ketone; ester-based solvents such as ethyl acetate, butyl acetate, methyl benzoate, and methyl propionate; ether-based solvents such as tetrahydrofuran, dioxane, and dimethoxyethane; glycol ether-based solvents such as propylene glycol monomethyl ether acetate and 3-methoxy butyl acetate; aromatic hydrocarbon-based solvents such as toluene and xylene; aliphatic hydrocarbon-based solvents, and the like.

In addition to the above compound (a-3), an alkoxy silane having an alkyl group with at least one carbon atom can be optionally reacted with a silica fine particle (a-1) together with a compound (a-2) to obtain a reactive particle (A). By reacting the alkoxy silane having an alkyl group with at least one carbon atom, the water resistance of the coating film obtained using the obtained reactive particle (A) can be improved. Examples of the alkoxysilane having an alkyl group with at least one carbon atom include methyltrimethoxysilane, ethyltrimethoxysilane, propyltrimethoxysilane, butyltrimethoxysilane, hexyltrimethoxysilane, decyltrimethoxysilane, dodecyl trimethoxysilane, and the like. Compounds (for example, methyltriethoxysilane) in which a methoxy group in the compound listed above is substituted with an ethoxy group are also included.

The reactive particle (A) can be obtained by reacting a silica fine particle (a-1) and a compound (a-2) with optionally a compound (a-3) (hereinbelow, in the explanation of the production method of the reactive particle (A), the compound (a-2) and the compound (a-3) are sometimes collectively referred to as "hydrolysable silane.") The method of reacting the silica fine particle (a-1) and the hydrolysable silane is not particularly limited. For example, [i] a method in which the silica fine particle (a-1) is mixed with the hydrolysable silane in the presence of an organic solvent that contains water to perform hydrolysis condensation, [ii] a method in which the hydrolysable silane is hydrolyzed in the presence of an organic solvent containing water, after which the hydrolyzed product of the hydrolyzed silane is condensed with the silica fine particle (a-1), and [iii] a method in which the silica fine particle (a-1) and the hydrolysable silane are mixed in the presence of water and other components, e.g., an organic solvent and a polymerizable unsaturated compound to perform hydrolysis condensation at once. Herein, water used in these production methods may be contained in starting materials, e.g., water, which is a dispersion medium of a colloidal silica fine particle.

The method of producing the reactive particle (A) can be specifically explained. The reactive particle (A) is, for example, produced as follows. In the presence of a colloidal silica fine particle (silica fine particle (a-1)), a hydrolysable silane, and optionally a lower alcohol and a polymerizable unsaturated compound, a dispersion medium in the colloidal silica fine particle, and a lower alcohol (including a lower alcohol generated by hydrolyzation of a hydrolysable silane) are subjected to azeotropic distillation together with a solvent having a higher boiling point than that of the lower alcohol, under ordinary pressure or reduced pressure, thereby substituting the dispersion medium with the solvent. Thereafter, dehydration condensation reaction under heating can be performed.

In the production method, a hydrolysis catalyst is added, if necessary, to a mixture of a colloidal silica fine particle (silica fine particle (a-1)), a hydrolysable silane, and optionally a lower alcohol and a polymerizable unsaturated compound to perform hydrolyzation of a hydrolysable silane according to a known method, such as stirring at room temperature or under heating. Subsequently, a dispersion medium in the colloidal silica fine particle and a lower alcohol are subjected to azeotropic distillation under ordinary pressure or reduced pressure, together with a solvent having a higher boiling point than the lower alcohol, thereby substituting the dispersion medium with the solvent. Thereafter, reaction is performed at a temperature of 60 to 150° C., preferably 80 to 130° C., while maintaining a nonvolatile concentration of 5 to 50 mass %, under stirring for 0.5 to 10 hours. After the reaction, it is preferable that water and lower alcohol generated by a condensation reaction or hydrolysable dissolution be subjected to azeotropic distillation with a solvent having a higher boiling point than a lower alcohol.

Examples of the solvent used in the reaction include hydrocarbon-based solvents such as benzene, toluene, xylene, ethylbenzene, and cyclohexane; halogenated hydrocarbon-based solvents such as trichloroethylene and tetrachloroethylene; ether-based solvents such as 1,4-dioxane and dibutyl ether; ketone-based solvents such as methylisobutylketone; ester-based solvents such as n-butyl acetate, isobutyl acetate, ethyl acetate, and ethyl propionate; polyhydric alcohol derivatives such as ethylene glycol monobutyl ether; and the like.

The nonvolatile concentration in the reaction is preferably within 5 to 50 mass. When the nonvolatile concentration is less than 5 mass, i.e., when a solvent exceeds 95 mass, the reaction of the silica fine particle (a-1) and the hydrolysable silane is insufficient, and a cured coating film obtained from an active energy curable composition containing a reactive particle may have poor transparency. On the other hand, a nonvolatile concentration exceeding 50 mass % may cause product gelation.

By binding the silicon atom on the silica fine particle (a-1) surface and the silicon atom on the hydrolysable silane via an oxygen atom according to the aforementioned methods, a reactive particle (A) in which the silica fine particle (a-1) is chemically bonded to the hydrolysable silane can be obtained.

The proportion of the compound (a-2) in the production of the reactive particle (A) is preferably 1 part by mass or more, more preferably 2 parts by mass or more, and particularly preferably 5 parts by mass or more, per 100 parts by mass or more of the silica fine particle (a-1). Although the upper limit of the proportion is not limited, it is preferably 95 parts by mass or less, and more preferably 90 parts by mass or less. When the proportion of the compound (a-2) in the production of the reactive particle (A) is less than 1 part by mass, the reactive particle (A) in the active energy ray-curable composition has insufficient dispersibility, which may result in the obtained cured coating film with insufficient transparency. The proportion of the silica fine particle (a-1) in the starting material in the production of the reactive particle (A) is preferably 5 to 99 parts by mass, and more preferably 10 to 98 parts by mass, per 100 parts by mass of the obtained reactive particle (A).

To obtain the reactive particle (A) by reacting the silica fine particle (a-1) and the compound (a-2), when the compound (a-3) is reacted with the compound (a-2), the total proportion of the compound (a-2) and the compound (a-3) is preferably 1 part by mass or more, more preferably 5 parts by mass or more, particularly preferably 10 parts by mass or more, per 100 parts by mass of the silica fine particle (a-1). The upper limit of the proportion is not limited, and it is preferably 95 mass parts or less, and more preferably 90 mass parts or less. When the total proportion of the compound (a-2) and the compound (a-3) is less than 1 part by mass, the dispersibility of the reactive particle (A) in the active energy ray-curable composition is not sufficient, which may result in a cured coating film with insufficient transparency. The proportion of the silica fine particle (a-1) in the starting material in the production of the reactive particle (A) is preferably 5 to 99 parts by mass, and more preferably 10 to 98 parts by mass, per 100 parts by mass of the obtained reactive particle (A). Further, the proportion of the compound (a-2) and the compound (a-3) (compound (a-2)/compound (a-3)) is preferably 10/90-90/10 (mass ratio), and more preferably 20/80 to 80/20 (mass ratio) from the viewpoint of active energy ray curability in the presence of a photopolymerization initiator. When an alkoxy silane having an alkyl group with at least one carbon atom is used, the proportion is 2.5 to 100 mass %, and preferably 25 to 50 mass % relative to the total amount of the compounds (a-2) and (a-3), to improve the water resistance of the coating film.

The amount of the reactive particle (A) in the active energy ray-curable composition is not particularly limited. From the viewpoint of scratch resistance and transparency of the cured coating film, the amount of the reactive particle is 1 to 90 parts by mass, preferably 10 to 80 parts by mass, and particularly preferably 10 to 70 parts by mass per 100 parts by mass of the nonvolatile matter of the active energy ray-curable composition.

Photopolymerization Initiator (B)

The active energy ray-curable composition of the present invention may further include a photopolymerization initiator (B). The photopolymerization initiator (B) is not limited as long as it generates a radical by absorbing an active energy ray.

Examples of the photopolymerization initiator (B) include α-diketone compounds such as benzyl and diacetyl; acyloin compounds such as benzoin; acyloin ether compounds such as benzoin methyl ether, benzoin ethyl ether, and benzoin isopropyl ether; thioxanthone compounds such as thioxanthone, 2,4-diethyl thioxanthone, 2-isopropylthioxanthone, and thioxanthone-4-sulfonic acid; benzophenone compounds such as benzophenone, 4,4'-bis(dimethylamino)benzophenone, and 4,4'-bis(diethylamino)benzophenone; Michler's ketone compounds; acetophenone compounds such as acetophenone, 2-(4-toluenesulfonyloxy)-2-phenylacetophenone, p-dimethylamino acetophenone, α,α'-dimethoxyacetoxy benzophenone, 2,2'-dimethoxy-2-phenylacetophenone, p-methoxyacetophenone, 2-methyl[4-(methylthio)phenyl]-2-morpholino-1-propanone, 2-benzyl-2-dimethylamino-1-(4-morpholino phenyl)-butan-1-one, α-isohydroxy isobutyl phenone, α,α'-dichloro-4-phenoxyacetophenone, and 1-hydroxy-cyclohexyl-phenyl-ketone; acyl phosphine oxide compounds such as 2,4,6-trimethylbenzoyl diphenylphosphine oxide and bis(acyl)phosphine oxide; quinone compounds such as anthraquinone and 1,4-naphtoquinone; halogen compounds such as phenacyl chloride, trihalomethyl phenylsulfone, and tris(trihalomethyl)-s-triazine; superoxides such as di-t-butyl peroxide, and the like. They can be used singly or as a mixture of two or more.

Examples of the commercially available products of the photopolymerization initiator (B) include Irgacure (IRGACURE) 184, Irgacure 261, Irgacure 500, Irgacure 651, Irgacure 819, Irgacure 907, and Irgacure CGI-1700 (IRGACURE (trade name in English) produced by Ciba Specialty Chemicals, Co., Ltd), Darocur-1173, Darocur-1116, Darocur-2959, Darocur-1664, and Darocur-4043 (Darocur (trade name in English) produced by Merck Japan), Kayacure-MBP, Kayacure DETX-S, Kayacure DMBI, Kayacure EPA, and Kayacure OA (KAYACURE (trade name in English) produced by the Nippon Kayaku Co., Ltd.), Vicure-10, Vicure-55 (trade name produced by Stauffer Co., Ltd.), Trigonal P1 (trade name, produced by Akzo Co., Ltd.), Sandoray 1000 (trade name, produced by Sandoz Co., Ltd.)], Deap (trade name, produced by APJOHN Co., Ltd.,) Quantacure-PDO, Quantacure-ITX, Quantacure-EPD (trade name, produced by Ward Blekinsop Co., Ltd).

As the photopolymerization initiator (B), a mixture comprising one or more compounds selected from thioxanthone compounds, acetophenone compounds, and acyl phosphine oxide compounds is preferable. Of these, a mixture of acetophenone and acyl phosphine oxide compounds is particularly preferable from the viewpoint of photocurability.

Although the amount of the photopolymerization initiator (B) is not particularly limited, it is preferably 0.5 to 10 parts by mass, and more preferably 1 to 5 parts by mass, per 100 parts by mass of the nonvolatile matter in the active energy ray-curable composition. The lower limit of this scope is significant from the viewpoint of improving active energy ray curability, and the upper limit of this scope is significant in terms of cost and depths curability.

Polymerizable Unsaturated Compound (C)

The active energy ray-curable composition of the present invention may further comprise the polymerizable unsaturated compound (C). The polymerizable unsaturated compound (C) is not particularly limited as long as it is a compound other than the reactive particle (A), and has at least one polymerizable unsaturated double bond in the chemical structure.

Examples of the polymerizable unsaturated compound (C) include monofunctional polymerizable unsaturated compounds and polyfunctional polymerizable unsaturated compounds.

Examples of the monofunctional polymerizable unsaturated compound include ester compounds of monohydric alcohol and (meth)acrylic acid, and the like. Specific examples thereof include methyl(meth)acrylate, ethyl(meth)acrylate, n-propyl(meth)acrylate, isopropyl(meth)acrylate, n-butyl(meth)acrylate, isobutyl(meth)acrylate, t-butyl(meth)acrylate, neopentyl(meth)acrylate, cyclohexyl(meth)acrylate, tetrahydrofurfuryl(meth)acrylate, isobornyl(meth)acrylate, phenyl(meth)acrylate, benzyl(meth)acrylate, N-acryloyloxyethyl hexahydro phthalimide, and the like. Other examples include hydroxy-containing(meth)acrylates such as hydroxyethyl (meth)acrylate, hydroxypropyl(meth)acrylate, and hydroxybutyl (meth)acrylate; carboxy-containing(meth)acrylates such as acrylic acid, methacrylic acid, crotonic acid, itaconic acid, maleic acid, fumaric acid, 2-carboxyethyl(meth)acrylate, 2-carboxypropyl(meth)acrylate, and 5-carboxypentyl(meth)acrylate; glycidyl-containing polymerizable unsaturated compounds such as glycidyl (meth)acrylate and allyl glycidyl ether; vinyl aromatic compounds such as styrene, α-methylstyrene, vinyltoluene, and α-chlorostymene; nitrogen-containing alkyl(meth)acrylates such as N,N-dimethylaminoethyl(meth)acrylate, N,N-diethylaminoethyl(meth)acrylate, and N-t-butyl aminoethyl (meth)acrylate; and polymerizable amide compounds such as acrylamide, methacrylamide, N-methyl(meth)acrylamide, N-ethyl(meth)acrylamide, N-methylol(meth)acrylamide, N-methoxymethyl(meth)acrylamide, N-butoxymethyl (meth)acrylamide, N,N-dimethyl(meth)acrylamide, N,N-dimethylaminopropyl(meth)acrylamide, and N,N-dimethylaminoethyl(meth)acrylamide.

Examples of the polyfunctional polymerizable unsaturated compound include ester compounds of polyhydric alcohol and (meth)acrylic acid, and the like. Specific examples include di(meth)acrylate compounds such as ethylene glycol di(meth)acrylate, diethylene glycol di(meth)acrylate, triethylene glycol di(meth)acrylate, tetraethylene glycol di(meth)acrylate, 1,3-butanediol di(meth)acrylate, 1,4-butanediol di(meth)acrylate, 1,9-nonanediol di(meth)acrylate, glycerin-di(meth)acrylate, trimethylolpropane di(meth)acrylate, pentahaerythritol di(meth)acrylate, neopentyl glycol di(meth)acrylate, 1,6-hexanediol di(meth)acrylate, pentaerythritol di(meth)acrylate, bisphenol A ethylene oxide-modified di(meth)acrylate, cyclohexane dimethanol di(meth)acrylate, tricyclodecane dimethanol di(meth)acrylate, hydrogenated bisphenol A di(meth)acrylate, hydrogenated bisphenol F di(meth)acrylate, hydrogenated hexafluoro bisphenol A di(meth)acrylate, bis(2-(meth)acryloyloxy)hexahydrophthalic acid, and 5-ethyl-2-(2-hydroxy-1,1-dimethylethyl)-5-(hydroxymethyl)-1,3-dioxane di(meth)acrylate; tri(meth)acrylate compounds such as glycerintri(meth)acrylate, trimethylolpropantri(meth)acrylate, trimethylolpropanepropylene oxide-modified tri(meth)acrylate, trimethylolpropanethylene oxide-modified tri(meth)acrylate, pentaerythritol tri(meth)acrylate, and ε-caprolactone-modified tris(acryloxyethyl)isocyanurate; tetra(meth)acrylate compounds such as pentaerythritol tetra(meth)acrylate; dipentaerythritol penta(meth)acrylate, dipentaerythritol hexa(meth)acrylate, and the like. Other examples thereof include polymerizable unsaturated group-containing acrylic resins, urethane(meth)acrylate resins, epoxy(meth)acrylate resins, polyester(meth)acrylate resins, and the like. Examples of the polymerizable unsaturated group-containing acrylic resins include a polymerizable unsaturated group-containing acrylic resin produced by adding a glycidyl group-containing polymerizable unsaturated compound such as glycidyl(meth)acrylate, to a carboxyl-containing acrylic resin, a polymerizable unsaturated group-containing acrylic resin produced by adding a compound having a polymerizable unsaturated group and an isocyanate group such as 2-isocyanate ethyl(meth)acrylate to a hydroxy-containing acrylic resin. These polymerizable unsaturated compounds can be used singly or in combination of two or more.

Polyfunctional polymerizable unsaturated compounds include a polymerizable unsaturated compound represented by formula (XVI) below and/or a polymerizable unsaturated compound represented by formula (XVII) below.

In formula (XVI), $R^4$ is the same or different and represents a hydrogen atom or a methyl group, $R^5$ is the same or different and represents a $C_{1-6}$ divalent hydrocarbon group, m is the same or different, and represents an integer of 0 to 5. In formula (XVII), $R^7$ is the same or different, and represents a hydrogen atom or a methyl group. $R^8$ is the same or different, and represents a $C_{1-6}$ divalent hydrocarbon group.

$R^5$ is not limited as long as it is a $C_{1-6}$ divalent hydrocarbon group. Specific examples thereof include a methylene group, ethylene group, 1,2-propylene group, 1,3-propylene group, 1,2-butylene group, 1,4-butylene group, hexylene group, and the like. Of these, $C_{2-4}$ divalent hydrocarbon groups, particularly ethylene groups are preferable.

$R^8$ is not limited as long as it is a $C_{1-6}$ divalent hydrocarbon group. Specific examples thereof include a methylene group, ethylene group, 1,2-propylene group, 1,3-propylene group, 1,2-butylene group, 1,4-butylene group, hexylene group, and the like. Of these, $C_{2-4}$ divalent hydrocarbon groups, especially ethylene groups are preferable.

The polymerizable unsaturated compound represented by formula (XVI) can be obtained by heating an isocyanurate ring adduct of 1,6-hexamethylene diisocyanate, and hydroxyalkyl(meth)acrylate or caprolactone-modified hydroxyalkyl(meth)acrylate in the presence of a tin catalyst such as di-n-butyl tin dilaurate at 60 to 70° C. for several hours in a manner such that the amount of the isocyanate group is almost the same as the amount of the hydroxyl group.

Examples of the polymerizable unsaturated compound represented by formula (XVII) include tris(2-acryloyloxyethyl)isocyanurate, tris(2-acryloyloxypropyl)isocyanurate, and the like.

Herein, the polymerizable unsaturated compound represented by Formula (XVI) is the same compound as the compound represented by formula (VIII), which is explained in

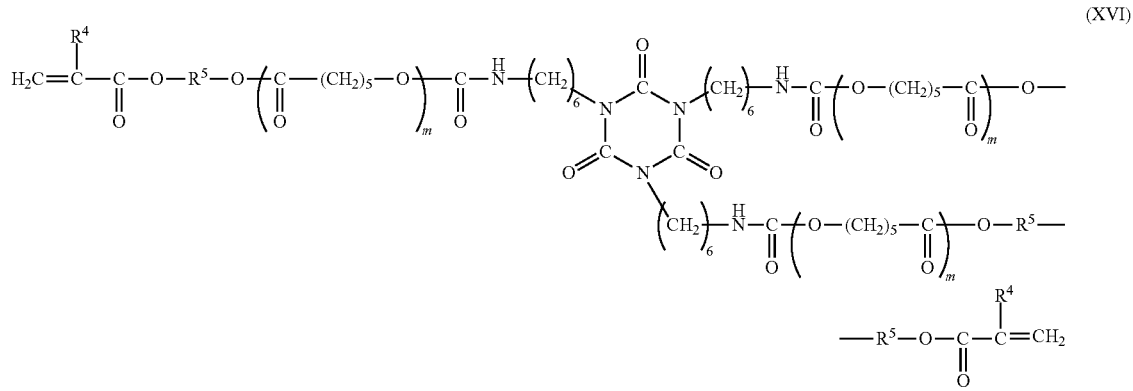

(XVI)

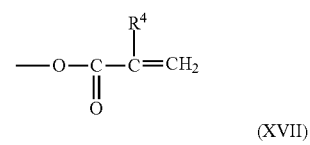

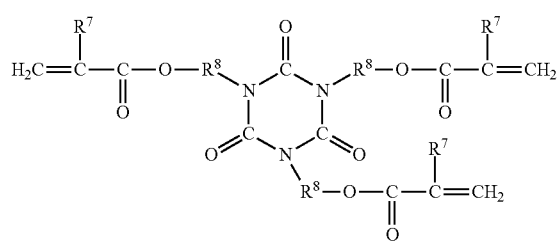

(XVII)

the production method of the reactive particle (A). The polymerizable unsaturated compound represented by formula (XVII) is the same compound as the compound represented by formula (XI), which is explained in the production method of the reactive particle (A). Therefore, in producing the reactive particle (A), the polymerizable unsaturated compound represented by formula (XVI) or the polymerizable unsaturated compound represented by formula (XVII) may be included; however, the polymerizable unsaturated compound represented by formula (XVI) and the polymerizable unsaturated compound represented by formula (XVII) are included in the polymerizable unsaturated compound (C) in the present invention.

The polyfunctional polymerizable unsaturated compound can be obtained by reacting a hexamethylene diisocyanate trimer having an imino-oxadiazinedione group with hydroxyalkyl(meth)acrylate in the presence of a catalyst in a manner such that the amount of the isocyanate group is almost the same as the amount of the hydroxy group. Examples of the commercially available products of hexamethylene diisocyanate trimer having an imino oxadiazine dione group include Desmodur XP2410 (produced by Bayer Material Science Co., Ltd.), and the like. Examples of the hydroxyalkyl(meth)acrylate include 2-hydroxyethyl(meth)acrylate, 2-hydroxypropyl(meth)acrylate, 3-hydroxypropyl(meth)acrylate, 4-hydroxybutyl(meth)acrylate, and the like.

The reaction of the hexamethylene diisocyanate trimer and hydroxyalkyl(meth)acrylate can be performed at 0 to 200° C., preferably 20 to 200° C., and more preferably 20 to 120° C. The reaction is generally completed in about 2 to 10 hours. In the reaction, a catalyst can be optionally used. Examples of the catalyst include tertiary amines such as triethylamine, organometallic compounds such as dibutyltin dilaurate, and the like.

In the reaction, a solvent can be optionally used. Examples of the solvent include ester-based solvents such as ethyl acetate, butyl acetate, methyl benzoate, and methyl propionate; ether-based solvents such as tetrahydrofuran, dioxane, and dimethoxyethane; glycol ether-based solvents such as propylene glycol monomethyl ether, propylene glycol monomethyl ether acetate, and 3-methoxy butyl acetate; aromatic hydrocarbon-based solvents such as toluene and xylene; aliphatic hydrocarbon-based solvents; and the like.

The active energy ray-curable composition of the present invention preferably includes the polymerizable unsaturated compound represented by formula (XVI) and/or the polymerizable unsaturated compound represented by formula (XVII) from the viewpoint of weather resistance and adhesion properties of the obtained cured coating film to a substrate.

The proportion of the polymerizable unsaturated compound (C) in the active energy ray-curable composition of the present invention is not limited. From the viewpoint of weather resistance and the adhesion properties of the obtained cured coating film to a substrate, the proportion of the polymerizable unsaturated compound (C) is preferably 1 to 95 parts by mass, more preferably 10 to 80 parts by mass, and even more preferably 20 to 70 parts by mass relative to 100 parts by mass of the nonvolatile matter of the active energy ray-curable composition.

The active energy ray-curable composition of the present invention may include, if necessary, various additives, saturated resins, etc., and may be diluted with a solvent if desired. Examples of the additives include sensitizing agents, UV absorbers, light stabilizers, polymerization inhibitors, antioxidants, antifoams, surface control agents, plasticizers, colorants, and the like. Examples of the saturated resins include saturated acrylic resins, saturated polyester resins, and saturated urethane resins.

Examples of the solvent used for dilution include ketone-based solvents such as acetone, methyl ethyl ketone, and methyl isobutyl ketone; ester-based solvents such as ethyl acetate, butyl acetate, methyl benzoate, and methyl propionate; ether-based solvents such as tetrahydrofuran, dioxane, and dimethoxyethane; glycol ether-based solvents such as ethylene glycol monomethyl ether, ethylene glycol monoethyl ether, diethylene glycol monomethyl ether, propylene glycol monomethyl ether acetate, and 3-methoxy butyl acetate; aromatic hydrocarbon-based solvents; aliphatic hydrocarbon-based solvents; and the like. These can be optionally combined and used according to the purposes, such as viscosity adjustment and application adjustment.

As a UV absorber, conventionally known products can be used. Examples thereof include benzotriazole-based absorbents, triazine-based absorbents, salicyl derivative-based absorbents, benzophenone-based absorbents, and the like.

Examples of the benzotriazole-based absorbents include 2-(2'-hydroxy-5'-methylphenyl)benzotriazole, 2-(2'-hydroxy-5'-t-buthylphenyl)benzotriazole, 2-(2'-hydroxy-3',5'-di-t-buthylphenyl)benzotriazole, 2-(2'-hydroxy-3'-t-butyl-5'-methylphenyl)-5-chloro benzotriazole, 2-(2'-hydroxy-3',5'-di-t-buthylphenyl)-5-chloro benzotriazole, amyl phenyl) benzotriazole, 2-(2'-hydroxy-4'-octoxy phenyl) benzotriazole, 2-{2'-hydroxy-3'-(3",4",5",6"-tetrahydro phthalimidomethyl)-5'-methylphenyl}benzotriazole, and the like.

Example of the triazine-based absorbents include 2,4-bis(2,4-dimethylphenyl)-6-(2-hydroxy-4-iso octyloxyphenyl)-1,3,5-triazine, 2-[4-((2-hydroxy-3-dodecyloxypropyl)-oxy)-2-hydroxyphenyl]-4,6-bis(2,4-dimethylphenyl)-1,3,5-triazine, 2-[4-(2-hydroxy-3-tridecyloxypropyl)-oxy)-2-hydroxyphenyl]-4,6-bis(2, 4-dimethylphenyl)-1,3,5-triazine, 2-(2,4-dihydroxyphenyl)-4,6-bis(2,4-dimethylphenyl)-1,3,5-triazine, and the like.

Examples of the salicylic acid derivative-based absorbent include phenyl salicylate, p-octylphenylsalicylate, 4-tert-buthylphenylsalicylate, and the like.

Specific examples of the benzophenone-based absorbents include 4-dihydroxybenzophenone, 2-hydroxy-4-methoxybenzophenone, 2,2'-dihydroxy-4-methoxybenzophenone, 2-hydroxy-4-methoxy-2'-carboxy benzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoyl resorcinol, 4,6-dibenzoyl resorcinol, hydroxydodecylbenzophenone, and the like. As the UV absorber, known polymerizable UV absorbers can be used. Examples thereof include 2-(2'-hydroxy-5'-methacryloiloxyethyl phenyl)-2H-benzotriazole, 2,2'-dihydroxy-4-(3-metacryloxy-2-hydroxypropoxy)benzophenone, and the like.

Commercially available products of the UV absorber include TINUVIN900, TINUVIN928, TINUVIN348-2, TINUVIN479, and TINUVIN405 (trade name, produced by Ciba Specialty Chemicals) RUVA93 (trade name, produced by Otsuka Chemical Co., Ltd.), and the like.

The amount of the UV absorber is not particularly limited, and it is about 0.1 to 10 parts by mass, preferably 0.2 to 10 parts by mass, per 100 parts by mass of the nonvolatile matter of the active energy ray-curable composition.

On the other hand, a light stabilizer can be used as a radical chain inhibitor that catches an active radical produced in the coating film deterioration process. Examples thereof include hindered amine-based light stabilizers and the like.

Of the light stabilizers, a hindered piperidine compound can be used as a light stabilizer that exhibits an excellent light stabilization effect. Examples of the hindered piperidine compound include bis(1,2,2,6,6-pentamethyl-4-piperidyl) sebacate, bis(2,2,6,6-tetramethyl-4-piperidinyl)sebacate, bis(N-methyl-2,2,6,6-tetramethyl-4-piperidinyl)sebacate, 4-benzoyloxy-2,2',6,6'-tetramethylpiperidine, bis(1,2,2,6,6-pentamethyl-4-piperidyl) {[3,5-bis(1,1-dimethylethyl)-4-hydroxyphenyl]methyl}butyl malonate, and like monomer-type compounds; poly{[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)iminol]}, and like oligomer-type compounds; polyester compounds of 4-hydroxy-2,2,6,6-tetramethyl-1-piperidine ethanol and a succinic acid, and like polyester binding-type compounds, etc. However, the hindered piperidine compound is not limited thereto. As the light stabilizer, a known polymerizable light stabilizer can be used.

Commercially available products of the light stabilizer include TINUVIN 123, TINUVIN 152, and TINUVIN 292 (trade name, Ciba Specialty Chemicals), HOSTAVIN 3058 (trade name, Clariant Japan), Adeka STAB LA-82 (trade name, Adeka Corporation), and the like.

The amount of the light stabilizer is not limited, and it is preferably in the range of 0.1 to 10 parts by mass, more preferably 0.2 to 5 parts by mass, per 100 parts by mass of the nonvolatile matter of the active energy ray-curable composition.

The nonvolatile matter of the active energy ray-curable composition of the present invention is not limited, and it is about 20 to 100% by mass, and preferably 25 to 70% by mass. This range is significant in terms of smoothness of the coating film and reduction of drying time.

The method of applying the active energy ray-curable composition of the present invention to the substrate surface is not limited. Examples of the method include roller coating, roll coater coating, spin coater coating, curtain roll coater coating, slit coater coating, spray painting, electrostatic coating, dip coating, silk printing, spin coating, and the like.

The substrate is not particularly limited, and specific examples thereof include metallic materials such as iron, aluminium, brass, copper, stainless steel, tin plate, galvanized steel, alloying zinc (Zn—Al, Zn—Ni, Zn—Fe, etc.) plating steel; resins such as polyethylene resin, polypropylene resin, acrylonitrile butadiene styrene (ABS) resin, polyamide resin, acrylic resin, vinylidene chloride resin, polycarbonate resin, polyurethane resin, and epoxy resin; plastic materials such as various FRPs; inorganic materials such as glass, cement, and concrete; wood; fiber materials (paper, cloth, etc.), and the like. On the substrate, a primer layer, electrodeposition coating film layer, intermediate layer, top coat layer, or the like can be formed by applying a primer coating composition, cationic electrodeposition coating composition, intermediate coating composition, top coating composition, or the like.

When the coating film is formed from the active energy ray-curable composition, drying can be performed, if necessary. Drying is not limited as long as the condition is such that the added solvent can be removed. For example, drying can be performed at 20 to 100° C. for 3 to 20 minutes.

The thickness of the coating film is suitably determined according to the purpose. For example, the film thickness is preferably 1 to 100 µm, and more preferably 1 to 50 µm. When the thickness of the film is the lower limit of this scope or more, the coating film has excellent smoothness and appearance. When the thickness of the film is the upper limit of this scope or lower, the coating film has excellent curability and scratch resistance.

The active energy ray-curable composition is applied to the substrate surface and dried as necessary. Thereafter, active energy ray radiation is performed to form a cured coating film. The radiation source and the radiation amount of the active energy ray radiation are not particularly limited. Examples of the active energy ray radiation sources include ultra-high-pressure-, high-pressure-, medium-pressure-, or low-pressure-mercury vapor lamps, chemical lamps, carbon arc lamps, xenon lamps, metal halide lamps, fluorescent lamps, tungsten lamps, sunlight, and the like. The radiation amount is preferably 5 to 20,000 J/m$^2$, and more preferably 100 to 10,000 J/m$^2$.

Active energy ray radiation may be performed under an air atmosphere or an inert gas atmosphere. Examples of the inert gas include nitrogen, carbon dioxide, and the like. Active energy ray radiation under an inert gas atmosphere is preferable in terms of curability.

If necessary, a coating film may be heated after active energy ray radiation. By heating, distortion of the coating film generated by curing of the coating film by active energy ray radiation can be alleviated. Moreover, by this heating, the curability or adhesion of the coating film may be improved. Heating is generally performed under an atmosphere temperature of 150 to 250° C. for 1 to 30 minutes.

EXAMPLES

Hereinafter, the present invention is explained in detail with reference to examples. In the examples, "parts" and "%" represent "parts by mass" and "percent by mass", respectively, unless otherwise specified. The structure analysis and measurement in the examples are performed with the following analyser device and measurement method in addition to the analyser device disclosed in the present specification.
($^{29}$Si-NMR, $^1$H-NMR analysis)
Device: FT-NMR EX-400 produced by JEOL Ltd.
Solvent: CDCl$_3$
Internal standard substance: tetramethylsilane

Production Example 1

179 parts of Sumidur N3300 (produced by Sumika Bayer Urethane Co., Ltd.), 87 parts of 2-hydroxyethyl acrylate, 205 parts of isobutyl acetate, and 1 part of p-methoxy phenol were placed into a four-necked flask equipped with a reflux condenser, a thermometer, an air inlet tube, and a stirrer, and the mixture was stirred. The temperature was raised to 100° C. while blowing air, and reaction was performed at 100° C. for 8 hours. After the reaction, the temperature was cooled to 5° C., and 41 parts of 3-aminopropyltriethoxysilane was added dropwise over 1 hour. During this, the temperature of the reaction product in the flask was adjusted so as not to exceed 20° C. Subsequently, 205 parts of ethylene glycol monobutyl ether was added to raise the temperature to 80° C., and stirring was performed for 1 hour at 80° C. Thereafter, isobutyl acetate was removed by distillation under reduced pressure, and a solution of a product (P1) (nonvolatile content: 60%) was obtained.

The obtained product (P1) had an NCO value of 0 mg NCO/g and an amine value of 0 mg KOH/g. $^1$H-NMR analysis of the product (P1) indicates that the molar ratio of the carbon-carbon unsaturated bond of the acryloyloxy group to the methylene group bonded to Si of the product (P1) was 4.0.

As a result of $^{29}$Si-NMR analysis of the product (P1), hydrolysis of the ethoxy silyl group in the product (P1) was not observed.

The aforementioned results indicate that the product (P1) is a mixture of a compound represented by formula (P-I) below and a compound represented by formula (P-II) below.

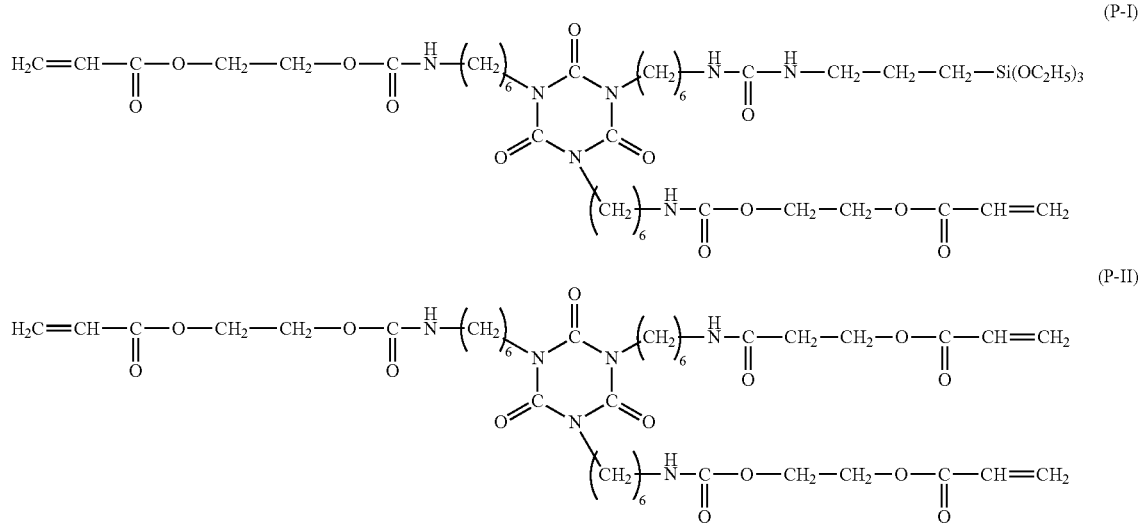

The ratio of the compound represented by formula (P-I)/ the compound represented by formula (P-II) was 60/40 (molar ratio).

Production Example 2

333 parts of colloidal silica fine particle (dispersion medium: isopropanol; silica concentration: 30 mass %; average primary particle diameter: 12 nm; trade name: IPA-ST; produced by Nissan Chemical Industries, Ltd.) (silica fine particle: 100 parts), 10 parts of 3-methacryloyloxy propyltrimethoxysilane, 0.2 parts of p-methoxy phenol, and 227 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P1) (nonvolatile content: 60%) obtained in Production Example 1 (6 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/ the compound represented by formula (P-II) was 100/3 (mass ratio). The mixture of the reactive particle and the compound represented by formula (P-II) obtained in this Production Example is referred to as a product (P2).

Production Example 3

333 parts of colloidal silica fine particle (dispersion medium: isopropanol; silica concentration: 30 mass; average primary particle diameter: 12 nm; trade name: IPA-ST; produced by Nissan Chemical Industries, Ltd.) (silica fine particle: 100 parts), 14 parts of 3-methacryloyloxy propyltrimethoxysilane, 0.2 parts of p-methoxy phenol, and 230 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 10 parts of the solution of the product (P1) (nonvolatile content: 60%) obtained in Production Example 1 (4 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/ the compound represented by formula (P-II) was 100/2 (mass ratio). The mixture of the reactive particle and the compound represented by formula (P-II) obtained in this Production Example is referred to as a product (P3).

Production Example 4

333 parts of colloidal silica fine particle (dispersion medium: isopropanol; silica concentration: 30 mass; average primary particle diameter: 12 nm; trade name: IPA-ST; produced by Nissan Chemical Industries, Ltd.) (silica fine particle: 100 parts), 6 parts of 3-methacryloyloxy propyltrimethoxysilane, 0.2 parts of p-methoxy phenol, and 223 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 23 parts of the solution of the product (P1) (nonvolatile content: 60%) obtained in Production Example 1 (8 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/the compound represented by formula (P-II) was 100/5 (mass ratio). The mixture of the reactive particle and the compound represented by formula (P-II) obtained in this Production Example is referred to as a product (P4).

Production Example 5

333 parts of colloidal silica fine particle (dispersion medium: isopropanol; silica concentration: 30 mass %; average primary particle diameter: 12 nm; trade name: IPA-ST; produced by Nissan Chemical Industries, Ltd.) (silica fine particle: 100 parts), 3 parts of 3-methacryloyloxy propyltrimethoxysilane, 0.2 parts of p-methoxy phenol, and 232 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 4 parts of the solution of the product (P1) (nonvolatile content: 60%) obtained in Production Example 1 (2 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/the compound represented by formula (P-II) was 100/1 (mass ratio). The mixture of the reactive particle and the compound represented by formula (P-II) obtained in this Production Example is referred to as a product (P5).

Production Example 6

333 parts of colloidal silica fine particle (dispersion medium: isopropanol; silica concentration: 30 mass; average primary particle diameter: 12 nm; trade name: IPA-ST; produced by Nissan Chemical Industries, Ltd.) (silica fine particle: 100 parts), 20 parts of 3-methacryloyloxy propyltrimethoxysilane, 0.2 parts of p-methoxy phenol, and 220 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 33 parts of the solution of the product (P1) (nonvolatile content: 60%) obtained in Production Example 1 (12 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/the compound represented by formula (P-II) was 100/6 (mass ratio). The mixture of the reactive particle and the compound represented by formula (P-II) obtained in this Production Example is referred to as a product (P6).

Production Example 7

250 parts of colloidal silica fine particle (dispersion medium: water; silica concentration: 40 mass %; average primary particle diameter: 20 nm; trade name: Snowtex O-40; produced by Nissan Chemical Industries, Ltd.) (silica fine particle: 100 parts), 10 parts of 3-methacryloyloxy propyltrimethoxysilane, 0.2 parts of p-methoxy phenol, and 143 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P1) (nonvolatile content: 60%) obtained in Production Example 1 (6 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/the compound represented by formula (P-II) was 100/3 (mass ratio). The mixture of the reactive particle and the compound represented by formula (P-II) obtained in this Production Example is referred to as a product (P7).

Production Example 8

100 parts of 3-isocyanatepropyl triethoxysilane, 47 parts of 2-hydroxyethyl acrylate, and 0.1 parts of p-methoxy phenol were placed into a separable flask equipped with a reflux condenser, a thermometer, and a stirrer. Reaction was conducted at 100° C. for 12 hours while blowing dry air to obtain a product (P8).

Production Example 9

333 parts of colloidal silica fine particle (dispersion medium: isopropanol; silica concentration: 30 mass %; average primary particle diameter: 12 nm; trade name: IPA-ST; produced by Nissan Chemical Industries, Ltd.) (silica fine particle: 100 parts), 10 parts of the product (P8) obtained in Production Example 8, 0.2 parts of p-methoxy phenol, and 227 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P1) (nonvolatile content: 60%) obtained in Production Example 1 (6 parts of the compound represented by formula (P-I)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/the compound represented by formula (P-II) was 100/3 (mass ratio). The mixture of the reactive particle and the compound represented by formula (P-II) obtained in this Production Example is referred to as a product (P9).

Production Example 10

179 parts of Sumidur N3300 (produced by Sumika Bayer Urethane Co., Ltd.), 108 parts of 4-hydroxybutyl acrylate, 205 parts of isobutyl acetate, and 1 part of p-methoxy phenol were placed into a four-necked flask equipped with a reflux condenser, a thermometer, an air inlet tube, and a stirrer, and the mixture was stirred. The temperature was raised to 100° C. while blowing air, and reaction was performed at 100° C. for 8 hours. After the reaction, the temperature was cooled to 5° C., and 41 parts of 3-aminopropyltriethoxysilane was added dropwise over 1 hour. During this, the temperature of the reaction product in the flask was adjusted so as not to exceed 20° C. Subsequently, 219 parts of ethylene glycol monobutyl ether was added to raise the temperature to 80° C., and stirring was performed for 1 hour at 80° C. Thereafter, isobutyl acetate was removed by distillation under reduced pressure, and a solution of a product (P10) (nonvolatile content: 60%) was obtained.

The obtained product (P10) had an NCO value of 0 mg NCO/g and an amine value of 0 mg KOH/g. $^1$H-NMR analysis of the product (P10) indicates that the molar ratio of the carbon-carbon unsaturated bond of the acryloyloxy group to the methylene group bonded to Si of the product (P10) was 4.0. As a result of $^{29}$Si-NMR analysis of the product (P10), hydrolysis of the ethoxy silyl group in the product (P10) was not observed.

The aforementioned results indicate that the product (P10) is a mixture of a compound represented by formula (P-III) below and a compound represented by formula (P-IV) below.

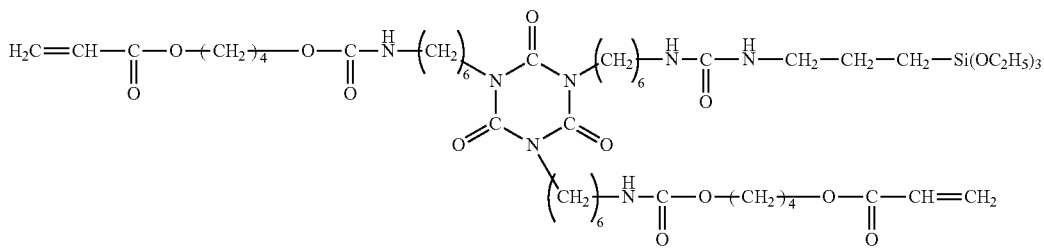

(P-III)

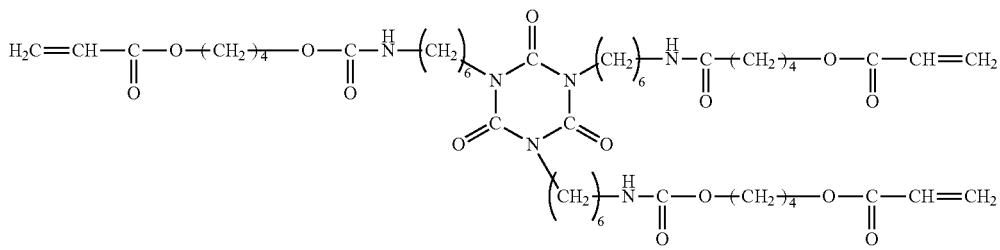

(P-IV)

The ratio of the compound represented by formula (P-III)/the compound represented by formula (P-IV) was 60/40 (molar ratio).

Production Example 11

333 parts of colloidal silica fine particle (dispersion medium: isopropanol; silica concentration: 30 mass %; average primary particle diameter: 12 nm; trade name: IPA-ST; produced by Nissan Chemical Industries, Ltd.) (silica fine particle: 100 parts), 10 parts of 3-methacryloyloxy propyltrimethoxysilane, 0.2 parts of p-methoxy phenol, and 227 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P10) (nonvolatile content: 60%) obtained in Production Example 10 (6 parts of the compound represented by formula (P-III)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-IV) (nonvolatile content: 40%). The ratio of the reactive particle and the compound represented by formula (P-IV) calculated from the addition amount was such that the reactive particle/the compound represented by formula (P-IV) was 100/3 (mass ratio). The mixture of the reactive particle and the compound represented by formula (P-IV) obtained in this Production Example is referred to as a product (P11).

Production Example 12

179 parts of Sumidur N3300 (produced by Sumika Bayer Urethane Co., Ltd.), 258 parts of Placcel FA-2D (trade name, ε-caprolactone modified 2-hydroxyethyl acrylate, produced by Daicel Corporation), 319 parts of isobutyl acetate, and 1 part of p-methoxy phenol were placed into a four-necked flask equipped with a reflux condenser, a thermometer, an air inlet tube, and a stirrer, and the mixture was stirred. The temperature was raised to 100° C. while blowing air, and reaction was performed at 100° C. for 8 hours. After the reaction, the temperature was cooled to 5° C., and 41 parts of 3-aminopropyltriethoxysilane was added dropwise over 1 hour. During this, the temperature of the reaction product in the flask was adjusted so as not to exceed 20° C. Subsequently, 319 parts of ethylene glycol monobutyl ether was added to raise the temperature to 80° C., and stirring was performed for 1 hour at 80° C. Thereafter, isobutyl acetate was removed by distillation under reduced pressure, and a solution of a product (P12) (nonvolatile content: 60%) was obtained.

The obtained product (P12) had an NCO value of 0 mg NCO/g and an amine value of 0 mg KOH/g. $^1$H-NMR analysis of the product (P12) indicates that the molar ratio of the carbon-carbon unsaturated bond of the acryloyloxy group to the methylene group bonded to Si of the product (P12) was 4.0. As a result of $^{29}$Si-NMR analysis of the product (P12), hydrolysis of the ethoxy silyl group in the product (P12) was not observed.

The aforementioned results indicate that the product (P12) is a mixture of a compound represented by formula (P-V) below and a compound represented by formula (P-VI) below.

(P-V)

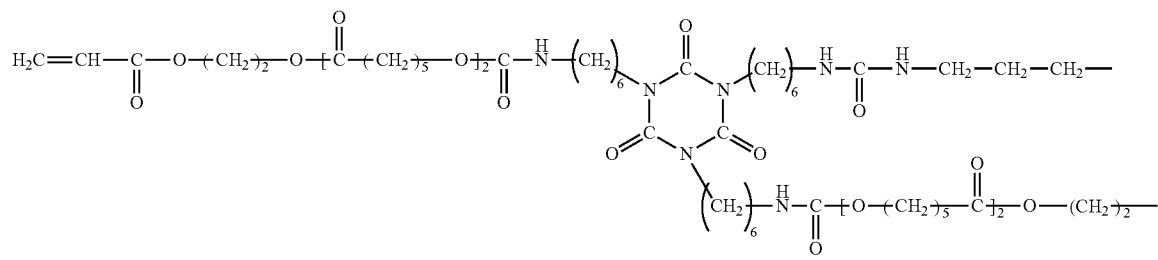

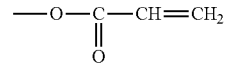

(P-VI)

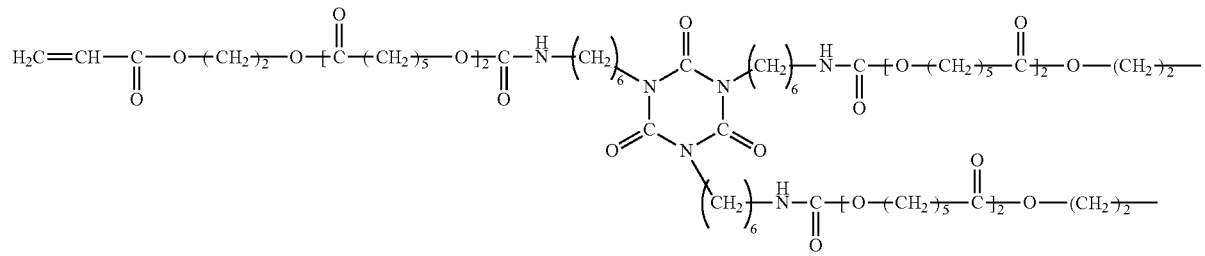

-continued

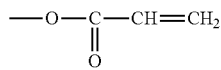

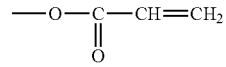

The ratio of the compound represented by formula (P-V)/the compound represented by formula (P-VI) was 60/40 (molar ratio).

Production Example 13

333 parts of colloidal silica fine particle (dispersion medium: isopropanol; silica concentration: 30 mass %; average primary particle diameter: 12 nm; trade name: IPA-ST; produced by Nissan Chemical Industries, Ltd.) (silica fine particle: 100 parts), 10 parts of 3-methacryloyloxy propyltrimethoxysilane, 0.2 parts of p-methoxy phenol, and 227 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P12) (nonvolatile content: 60%) obtained in Production Example 12 (6 parts of the compound represented by formula (P-V)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-VI) (nonvolatile content: 40%). The ratio of the reactive particle and the compound represented by formula (P-VI) calculated from the addition amount was such that the reactive particle/the compound represented by formula (P-VI) was 100/4 (mass ratio). The mixture of the reactive particle and the compound represented by formula (P-VI) obtained in this Production Example is referred to as a product (P13).

Production Example 14

179 parts of Aronix M-313 (isocyanuric acid EO-modified di- and tri-acrylate, produced by Toagosei Co., Ltd.), 38 parts of 3-isocyanatepropyltriethoxysilane, 145 parts of isobutyl acetate, and 1 part of p-methoxy phenol were placed into a four-necked flask equipped with a reflux condenser, a thermometer, an air inlet tube, and a stirrer, and the mixture was stirred. The temperature was raised to 100° C. while blowing air, and reaction was performed at 100° C. for 8 hours. After the reaction, the temperature was heated to 80° C. by adding ethylene glycol monobutyl ether, and stirring was performed for 1 hour at 80° C. Thereafter, isobutyl acetate was removed by distillation under reduced pressure, and a solution of a product (P14) (nonvolatile content: 60%) was obtained.

The obtained product (P14) had an NCO value of 0 mg NCO/g and an amine value of 0 mg KOH/g. $^1$H-NMR analysis of the product (P14) indicates that the molar ratio of the carbon-carbon unsaturated bond of the acryloyloxy group to the methylene group bonded to Si of the product (P14) was 7.7. As a result of $^{29}$Si-NMR analysis of the product (P14), hydrolysis of the ethoxy silyl group in the product (P14) was not observed.

The aforementioned results indicate that the product (P14) is a mixture of a compound represented by formula (P-VII) below and a compound represented by formula (P-VIII) below.

(P-VII)

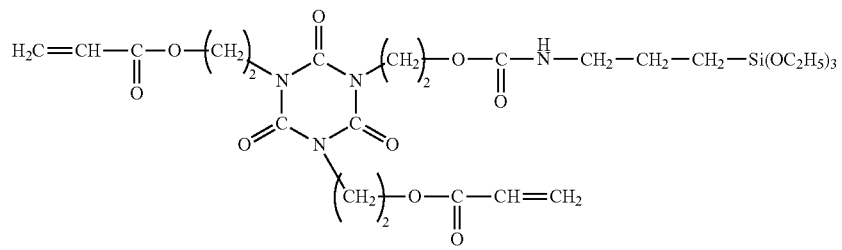

(P-VIII)

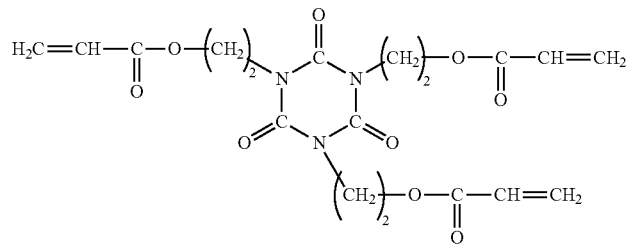

The ratio of the compound represented by formula (P-VII)/the compound represented by formula (P-VIII) was 35/65 (molar ratio).

Production Example 15

333 parts of colloidal silica fine particle (dispersion medium: isopropanol; silica concentration: 30 mass; average primary particle diameter: 12 nm; trade name: IPA-ST; produced by Nissan Chemical Industries, Ltd.) (silica fine particle: 100 parts), 10 parts of 3-methacryloyloxy propyltrimethoxysilane, 0.2 parts of p-methoxy phenol, and 227 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P14) (nonvolatile content: 60%) obtained in Production Example 14 (4 parts of the compound represented by formula (P-VII)) was added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-VIII) (nonvolatile content: 40%). The ratio of the reactive particle and the compound represented by formula (P-VIII) calculated from the addition amount was such that the reactive particle/the compound represented by formula (P-VIII) was 100/3 (mass ratio). The mixture of the reactive particle and the compound represented by formula (P-VIII) obtained in this Production Example is referred to as a product (P15).

Production Example 16

333 parts of colloidal silica fine particle (dispersion medium: isopropanol; silica concentration: 30 mass %; average primary particle diameter: 12 nm; trade name: IPA-ST; produced by Nissan Chemical Industries, Ltd.) (silica fine particle: 100 parts), 10 parts of 3-methacryloyloxy propyltrimethoxysilane, 0.2 parts of p-methoxy phenol, and 227 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. Subsequently, 17 parts of the solution of the product (P1) (nonvolatile content: 60%) obtained in Production Example 1 (6 parts of the compound represented by formula (P-I)) and 5 parts of decyltrimethoxy silane were added, and a dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a mixture having a reactive particle and the compound represented by formula (P-II) (nonvolatile content: 40%). The ratio of the reactive particle and the compound represented by formula (P-II) calculated from the addition amount was such that the reactive particle/the compound represented by formula (P-II) was 100/3 (mass ratio). The mixture of the reactive particle and the compound represented by formula (P-II) obtained in this Production Example is referred to as a product (P16).

Production Example 17

333 parts of colloidal silica fine particle (dispersion medium: isopropanol; silica concentration: 30 mass; average primary particle diameter: 12 nm; trade name: IPA-ST; produced by Nissan Chemical Industries, Ltd.) (silica fine particle: 100 parts), 10 parts of 3-methacryloyloxy propyltrimethoxysilane, 0.2 parts of p-methoxy phenol, and 233 parts of isopropanol were placed into a separable flask equipped with a reflux condenser, thermometer, and stirrer, and the temperature was raised while stirring. When the reflux of the volatile matter was started, propylene glycol monomethyl ether was added to perform azeotropic distillation, thereby substituting the solvent in the reaction system. A dehydration condensation reaction was performed while stirring at 95° C. for 2 hours. Thereafter, the temperature was reduced to 60° C. 0.03 parts of tetrabutylammonium fluoride was added, and the mixture was reacted while stirring for 1 hour. After completion of the reaction, the volatile matter was distilled off under reduced conditions, and propyleneglycol monomethylether was further added to perform azeotropic distillation. By adding propylene glycol monomethyl ether to perform azeotropic distillation several times, the solvent was substituted, thereby obtaining a dispersion of a reactive particle (nonvolatile content: 40%). The reactive particle obtained in this Production Example is referred to as a product (P17).

Production Example 18

179 parts of Sumidur N3300 (produced by Sumika Bayer Urethane Co., Ltd.), 109 parts of 2-hydroxyethyl acrylate, 192 parts of isobutyl acetate, and 1 part of p-methoxy phenol were placed into a four-necked flask equipped with a reflux condenser, a thermometer, an air inlet tube, and a stirrer, and the mixture was stirred. The temperature was raised to 100° C. while blowing air, and reaction was performed at 100° C. for 8 hours. After the reaction, 192 parts of ethylene glycol monobutyl ether was added to raise the temperature to 80° C., and stirring was performed for 1 hour at 80° C. Thereafter, isobutyl acetate was removed by distillation under reduced pressure, and a solution of a product (P1) (nonvolatile content: 60%) was obtained.

The obtained product (P18) had an NCO value of 0 mg NCO/g. The aforementioned results indicate that the product (P18) is a compound represented by formula (P-IX) below.

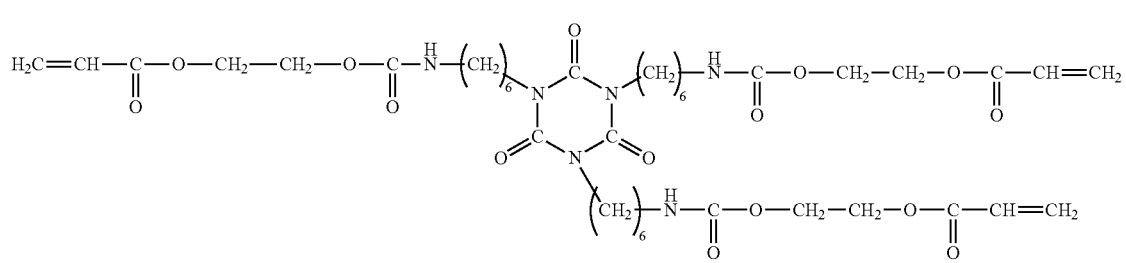

(P-IX)

Production Example 19

A mixture containing 50 parts of Desmodur XP2410 (produced by Bayer Material Science Company), 0.02 parts of dibutyltin dilaurate, and 0.1 parts of hydroquinone monomethyl ether was introduced into a four-necked flask equipped with a reflux condenser, a thermometer, an air inlet tube, and a stirrer. The mixture was heated to 80° C. under stirring. Next, 32.9 parts of 2-hydroxyethyl acrylate was added dropwise thereto over 2 hours in a manner such that the temperature of the mixture did not exceed 90° C., and the mixture was stirred for 4 hours at 80° C. 20.7 parts of 1-methoxy-2-propanol was added to obtain a solution of a product (p19) (nonvolatile content: 80%). The obtained product (P19) had an NCO value of 0 mg NCO/g.

Example 1

100.0 parts of the solution of the product (P2) (nonvolatile content: 40%) obtained in Production Example 2, 60.0 parts of EBECRYL1290 (trade name, six functional urethane acrylate produced by DAICEL-CYTEC Company Ltd.), 3.0 parts of 1-hydroxycyclohexyl-phenyl-ketone (photopolymerization initiator), and 0.5 parts of 2,4,6-trimethylbenzoyl diphenylphosphine oxide (photopolymerization initiator) were added, and the mixture was stirred after dilution with ethyl acetate to have a nonvolatile content of 30%, thereby producing active energy ray-curable composition No. 1. Table 1 shows the parts by mass of the component (A) and the component (C) per 100 parts by mass of the nonvolatile content in the active energy ray-curable composition No. 1. The amounts shown in Table 1 indicate the nonvolatile contents based on parts by mass.

Subsequently, the active energy ray-curable composition was applied to an ABS substrate (acrylonitrile-butadiene-styrene terpolymer resin substrate) degreased with isopropanol, to a dry film thickness of 10 μm using an applicator. Drying was performed at 80° C. for 10 min. to remove the solvent, and using a high-pressure mercury-vapor lamp (80 W/cm), an ultraviolet ray (peak top wavelength: 365 nm) was irradiated under a nitrogen atmosphere at a irradiation amount of 20,000 J/m² to form a cured coating film, thereby obtaining a test plate. The obtained test plate was subjected to the following evaluation. Table 1 shows the results.

Examples 2 to 20 and Comparative Examples 1 to 3

Active energy ray-curable compositions No. 2 to No. 23 in Examples 2 to 20 and Comparative Examples 1 to 3 were produced in the same manner as in Example 1 except that the components and the amounts were changed to those shown in Table 1.

Subsequently, cured coating films were formed according to the same method as in Example 1, thereby obtaining test plates. The obtained test plates were subjected to the following evaluation tests. Table 1 shows the evaluation results.

Note 1: KAYARAD R-604: trade name, Nippon Kayaku Co., Ltd.  5-ethyl-2-(2-hydroxy-1,1-dimethylethyl)-5-(hydroxymethyl)-1,3-dioxane diacrylate;
Note 2: Aronix M-315: Isocyanuric acid EO-modified di- and tri-acrylate; produced by Toagosei, Co., Ltd.;
Note 3: TINUVIN 384-2: trade name, UV absorber produced by Ciba Specialty Chemicals;
Note 4: TINUVIN 123: trade name, light stabilizer produced by Ciba Specialty Chemicals.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Active energy ray-curable composition No. | 1 | 2 | 3 | 4 | 5 | 6 | 7 | 8 | 9 | 10 | 11 | 12 |
| Product P2 | 40.0 | 40.0 | 40.0 | 40.0 | 40.0 | 50.0 | 20.0 | | | | | |
| Product P3 | | | | | | | | 40.0 | | | | |
| Product P4 | | | | | | | | | 40.0 | | | |
| Product P5 | | | | | | | | | | 40.0 | | |
| Product P6 | | | | | | | | | | | 40.0 | |
| Product P7 | | | | | | | | | | | | 40.0 |
| Product P9 | | | | | | | | | | | | |
| Product P11 | | | | | | | | | | | | |
| Product P13 | | | | | | | | | | | | |
| Product P15 | | | | | | | | | | | | |
| Product P16 | | | | | | | | | | | | |
| Product P17 | | | | | | | | | | | | |
| EBECRYL 1290 | 60.0 | | | | | 50.0 | 80.0 | 60.0 | 60.0 | 60.0 | 60.0 | 60.0 |
| Pentaerythritol triacrylate | | 60.0 | | | | | | | | | | |
| R-604 (Note 1) | | | 60.0 | | | | | | | | | |
| Product P18 | | | | 60.0 | | | | | | | | |

TABLE 1-continued

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Product P19 | | | | | 60.0 | | | | | | | |
| Aronix M-315 (Note 2) | | | | | | 60.0 | | | | | | |
| 1-Hydroxy-cyclohexyl-phenyl-ketone | 3.0 | 3.0 | 3.0 | 3.0 | 3.0 | 3.0 | 3.0 | 3.0 | 3.0 | 3.0 | 3.0 | 3.0 |
| 2,4,6-Trimethylbenzoyl-diphenylphosphinoxide | 0.5 | 0.5 | 0.5 | 0.5 | 0.5 | 0.5 | 0.5 | 0.5 | 0.5 | 0.5 | 0.5 | 0.5 |
| TINUVIN 384-2 (Note 3) | | | | | | | | | | | | |
| TINUVIN 123 (Note 4) | | | | | | | | | | | | |
| Amount of component (A) in 100 parts by mass of nonvolatile matter (parts by mass) | 37.5 | 37.5 | 37.5 | 37.5 | 37.5 | 46.9 | 18.8 | 37.9 | 36.8 | 38.3 | 36.5 | 37.5 |
| Amount of component (C) in 100 parts by mass of nonvolatile matter (parts by mass) | 59.1 | 59.1 | 59.1 | 59.1 | 59.1 | 49.8 | 77.9 | 58.8 | 59.9 | 58.4 | 60.2 | 59.1 |
| Adhesion | AA | AA | AA | AA | AA | AA | AA | AA | AA | AA | AA | AA |
| Scratch resistance (Note 5) | 8 | 8 | 8 | 8 | 8 | 6 | 10 | 8 | 8 | 7 | 9 | 8 |
| Weather resistance (Note 5) | A | A | A | A | A | A | A | A | A | A | A | A |
| Transparency | A | A | A | A | A | A | A | A | A | A | A | A |
| Comprehensive evaluation | AA | AA | AA | AA | AA | AA | AA | AA | AA | AA | AA | AA |

| | Example | | | | | | | | Comp. Ex. | | |
|---|---|---|---|---|---|---|---|---|---|---|---|
| | 13 | 14 | 15 | 16 | 17 | 18 | 19 | 20 | 1 | 2 | 3 |
| Active energy ray-curable composition No. | 13 | 14 | 15 | 16 | 17 | 18 | 19 | 20 | 21 | 22 | 23 |
| Product P2 | | | | | | | | | | | |
| Product P3 | | | | | | | | | | | |
| Product P4 | | | | | | | | | | | |
| Product P5 | | | | | | | | | | | |
| Product P6 | | | | | | | | | | | |
| Product P7 | | | | | | | | | | | |
| Product P9 | 40.0 | | | | | | | | | | |
| Product P11 | | 40.0 | | | | | | | | | |
| Product P13 | | | 40.0 | | | | | | | | |
| Product P15 | | | | 40.0 | 40.0 | | | | | | |
| Product P16 | | | | | | 50.0 | 40.0 | 40.0 | | | |
| Product P17 | | | | | | | | | 30.0 | 30.0 | 30.0 |
| EBECRYL 1290 | 60.0 | 60.0 | 60.0 | 60.0 | | 50.0 | 40.0 | 20.0 | 70.0 | | |
| Pentaerythritol triacrylate R-604 (Note 1) | | | | | | | 20.0 | 20.0 | | | |
| Product P18 | | | | | | | | 20.0 | | 70.0 | |
| Product P19 | | | | | 60.0 | | | | | | 70.0 |
| Aronix M-315 (Note 2) | | | | | | | | | | | |
| 1-Hydroxy-cyclohexyl-phenyl-ketone | 3.0 | 3.0 | 3.0 | 3.0 | 3.0 | 3.0 | 3.0 | 3.0 | 3.0 | 3.0 | 3.0 |
| 2,4,6-Trimethylbenzoyl-diphenylphosphinoxide | 0.5 | 0.5 | 0.5 | 0.5 | 0.5 | 0.5 | 0.5 | 0.5 | 0.5 | 0.5 | 0.5 |
| TINUVIN 384-2 (Note 3) | | | | | | | 3.0 | 3.0 | | | |
| TINUVIN 123 (Note 4) | | | | | | | 1.0 | 1.0 | | | |
| Amount of component (A) in 100 parts by mass of nonvolatile matter (parts by mass) | 37.5 | 37.5 | 37.2 | 37.5 | 37.5 | 46.9 | 37.5 | 37.5 | 29.0 | 29.0 | 29.0 |
| Amount of component (C) in 100 parts by mass of nonvolatile matter (parts by mass) | 59.1 | 59.1 | 59.5 | 59.1 | 59.1 | 49.8 | 59.1 | 59.1 | 67.6 | 67.6 | 67.6 |
| Adhesion | AA | AA | AA | AA | AA | AA | AA | AA | AA | AA | C |
| Scratch resistance (Note 5) | 8 | 8 | 8 | 8 | 8 | 8 | 9 | 9 | — | — | 8 |
| Weather resistance (Note 5) | A | A | A | A | A | A | A | A | — | — | C |
| Transparency | A | A | A | A | A | A | A | A | C | B | A |
| Comprehensive evaluation | AA | AA | AA | AA | AA | AA | AA | AA | C | C | C |

Note 5: "—" in Comparative Examples 1 and 2 indicates that the results were not evaluated because of poor compatibility of product P17 with the polymerizable unsaturated compound, and because of a considerably clouding coating film.

Adhesion

Cut lines were scored using a utility knife in a manner such that the incisions reached the substrate to make a grid of 100 segments, each segment having a size of 2 mm×2 mm. Adhesive cellophane tape (registered trademark) was attached to the surface and rapidly peeled off at 20° C. Thereafter, the number of grid segments in which a coating film reminded was counted and evaluated according to the following criteria.

AA: 100 (no peeling)
A: 90 to 99
B: 50 to 89
C: 49 or less

Scratch Resistance

In accordance with ASTM D-1044, an abrasion test was performed under the conditions of a CS-10F abrasion wheel, a load of 500 g, and a rotation speed of 500 cycles. After the test, samples were washed with a neutral detergent, and the haze was measured using a haze meter. The value of [haze after test−haze before test] was calculated and evaluated. A lower value indicates superior scratch resistance.

Weather Resistance

The test plates obtained was subjected to a 1,000-hour test using the sunshine weatherometer. The coating films were then evaluated by the naked eye according to the following criteria.

A: No abnormalities were observed, or slight blistering, discoloration, change in gloss, peeling, etc., were observed but posed no problem in practical use.
B: Blistering, discoloration, change in gloss, peeling, etc., were observed.
C: Significant blistering, discoloration, change in gloss, peeling, etc., were observed.

Transparency

Test plates were made by a similar manner mentioned above, except that the substrates were changed from ABS substrates to glass plates. The appearance of the resulting test plates was observed by the naked eye, and evaluated according to the following criteria.

A: Transparent and good
B: Slight clouding
C: Significant clouding

Comprehensive Evaluation

In coating fields to which the present invention pertains, such as coating of lighting materials of buildings, windows for vehicles, lamp lenses, and instrument covers, it is preferable that all properties including adhesion, scratch resistance, weather resistance, and transparency be excellent. Accordingly, comprehensive evaluation was performed according to the following criteria.

AA: Adhesion: AA, scratch resistance: 10 or less, weather resistance: A, and transparency: A
A: Adhesion: A, scratch resistance: 10 or less, weather resistance: A, and transparency: A
B: Adhesion: AA, A, or B, scratch resistance: 10 or less, weather resistance: A or B, and transparency: A or B, and at least one of the adhesion, scratch resistance, and weather resistance: B
C: At least one of the adhesion, scratch resistance, and weather resistance is C or non-measurable, or the scratch resistance exceeds 10.

The invention claimed is:

1. An active energy ray-curable composition comprising a reactive particle (A) obtained by reacting a silica fine particle (a-1) and a hydrolysable silane (a-2) having one or more (meth)acryloyloxy groups and one or more isocyanurate ring structures in a molecule.

2. The active energy ray-curable composition according to claim 1, comprising a photopolymerization initiator (B).

3. An active energy ray-curable composition according to claim 1 comprising a polymerizable unsaturated compound (C) other than the aforementioned component (A).

4. A coated article obtained by applying the active energy ray-curable composition according to claim 1 on a substrate.

5. An active energy ray-curable composition according to claim 2, comprising a polymerizable unsaturated compound (C) other than the aforementioned component (A).

6. A coated article obtained by applying the active energy ray-curable composition according to claim 2 on a substrate.

7. A coated article obtained by applying the active energy ray-curable composition according to claim 3 on a substrate.

8. A coated article obtained by applying the active energy ray-curable composition according to claim 5 on a substrate.

* * * * *